United States Patent
Tu et al.

(10) Patent No.: US 11,977,851 B2
(45) Date of Patent: May 7, 2024

(54) INFORMATION PROCESSING METHOD AND APPARATUS, AND STORAGE MEDIUM

(71) Applicant: Tencent Technology (Shenzhen) Company Limited, Guangdong (CN)

(72) Inventors: Zhaopeng Tu, Shenzhen (CN); Baosong Yang, Shenzhen (CN); Xing Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 561 days.

(21) Appl. No.: 17/184,165

(22) Filed: Feb. 24, 2021

(65) Prior Publication Data

US 2021/0182501 A1 Jun. 17, 2021

Related U.S. Application Data

(63) Continuation of application No. PCT/CN2019/117227, filed on Nov. 11, 2019.

(30) Foreign Application Priority Data

Nov. 19, 2018 (CN) .......................... 201811376563.5

(51) Int. Cl.
*G06F 40/40* (2020.01)
*G06N 3/08* (2023.01)

(52) U.S. Cl.
CPC .............. *G06F 40/40* (2020.01); *G06N 3/08* (2013.01)

(58) Field of Classification Search
None
See application file for complete search history.

(56) References Cited

U.S. PATENT DOCUMENTS

| 10,380,236 B1 * | 8/2019 | Ganu | G06F 40/169 |
| 11,410,015 B1 * | 8/2022 | Naumov | G06N 7/01 |

(Continued)

FOREIGN PATENT DOCUMENTS

| CN | 107368476 A | 11/2017 |
| CN | 107590192 A | 1/2018 |

(Continued)

OTHER PUBLICATIONS

International Search Report with English translation and Written Opinion for international priority application No. PCT/CN2019/117227, dated Jan. 23, 2020, 13 pages.

*Primary Examiner* — Stella L. Woo
(74) *Attorney, Agent, or Firm* — Crowell & Moring LLP

(57) ABSTRACT

Embodiments of this disclosure disclose an information processing method, apparatus and a non-transitory computer readable medium. The method includes: obtaining a target text sequence corresponding to to-be-processed text information; obtaining a context vector according to the target text sequence; determining a logical similarity corresponding to the target text sequence according to the context vector and the target text sequence; and encoding the target text sequence corresponding to target text information by using the logical similarity to obtain a text encoding result. In this embodiment of this disclosure, a context vector related to a discrete sequence is used to encode the discrete sequence, to strengthen the dependence between elements in the discrete sequence, thereby enhancing the performance of a neural network model and improving the learning capability of the model.

20 Claims, 11 Drawing Sheets

(56) References Cited

U.S. PATENT DOCUMENTS

| | | | |
|---|---|---|---|
| 2019/0018838 A1 | 1/2019 | Wu et al. | |
| 2019/0172466 A1* | 6/2019 | Lee | .......................... G06N 3/08 |
| 2019/0377797 A1 | 12/2019 | Liu et al. | |
| 2020/0226328 A1 | 7/2020 | Tu et al. | |
| 2020/0265192 A1 | 8/2020 | Lin | |

FOREIGN PATENT DOCUMENTS

| | | |
|---|---|---|
| CN | 108509413 A | 9/2018 |
| CN | 109543195 A | 3/2019 |
| WO | WO 2017/162134 A1 | 9/2017 |

\* cited by examiner

INFORMATION PROCESSING METHOD AND APPARATUS, AND STORAGE MEDIUM

RELATED APPLICATIONS

This application is a continuation of the PCT International Patent Application No. PCT/CN2019/117227, entitled "INFORMATION PROCESSING METHOD AND APPARATUS, AND STORAGE MEDIUM" and filed with the China National Intellectual Property Administration on Nov. 11, 2019, which claims priority to Chinese Patent Application No. 201811376563.5, entitled "TEXT TRANSLATION METHOD AND INFORMATION PROCESSING METHOD AND APPARATUSES" and filed with the Chinese Patent Office on Nov. 19, 2018. This application claims priority to the above applications, and the above applications are incorporated by reference in their entireties.

TECHNICAL FIELD

This application relates to the field of artificial intelligence (AI), and in particular, an information processing method and apparatus and a storage medium.

BACKGROUND

An attention mechanism has become a basic module in most deep learning models, and can dynamically select relevant representations in networks as required. Studies have shown that the attention mechanism plays a significant role in tasks such as machine translation (MT) and image annotation.

In related technologies, an attention weight is calculated for each element in a discrete sequence. The dependence between hidden states in a neural network is directly calculated. A direct connection is established between each upper-layer network representation and a lower-layer network representation.

However, during the calculation of the dependence between two elements in related technologies, only the relationship between the two elements is considered. Therefore, for a discrete sequence, the network representation of elements in the entire discrete sequence is weak, and as a result, the performance of a neural network model is degraded.

SUMMARY

Some embodiments of this disclosure provide an information processing method and apparatus and a storage medium. A context vector related to a discrete sequence is used to encode the discrete sequence, to strengthen the dependence between elements in the discrete sequence. Thereby, the performance of a neural network model is enhanced, and the learning capability of the model is improved.

In view of this, an aspect of this disclosure provides a text translation method, applied to a computer device. The method includes:
obtaining a target text sequence corresponding to target text information, the target text sequence including a plurality of elements;
obtaining a context vector according to the target text sequence;
determining a target query vector and a target key vector according to the context vector and the target text sequence, the target query vector having a correspondence with elements in the target text sequence, the target key vector having a correspondence with elements in the target text sequence;
determining a logical similarity corresponding to the target text sequence according to the target query vector and the target key vector;
encoding the target text sequence corresponding to the target text information by using the logical similarity to obtain a text encoding result; and
decoding the text encoding result to obtain a text translation result corresponding to the target text information.

Another aspect of this disclosure provides an information processing method, including:
obtaining a target text sequence corresponding to to-be-processed text information;
obtaining a context vector according to the target text sequence;
determining a logical similarity corresponding to the target text sequence according to the context vector and the target text sequence; and
encoding the target text sequence by using the logical similarity to obtain a text encoding result.

Still another aspect of this disclosure provides a text translation apparatus, including:
an obtaining module, configured to obtain a target text sequence corresponding to target text information, the target text sequence including a plurality of elements;
the obtaining module being further configured to obtain a context vector according to the target text sequence;
a determination module, configured to determine a target query vector and a target key vector according to the context vector and the target text sequence that are obtained by the obtaining module, the target query vector having a correspondence with elements in the target text sequence, the target key vector having a correspondence with elements in the target text sequence;
the determination module being further configured to determine a logical similarity corresponding to the target text sequence according to the target query vector and the target key vector;
an encoding module, configured to encode the target text sequence corresponding to the target text information by using the logical similarity determined by the determination module to obtain a text encoding result; and
a decoding module, configured to decode the text encoding result encoded by the encoding module to obtain a text translation result corresponding to the target text information.

Still another aspect of this disclosure provides an information processing method, applied to a computer device, and including:
obtaining a text encoding result;
obtaining a target context vector according to the text encoding result;
determining a logical similarity corresponding to the text encoding result according to the target context vector and the text encoding result; and
decoding the text encoding result by using the logical similarity corresponding to the text encoding result to obtain a text decoding result.

Still another aspect of this disclosure provides an information processing apparatus, including:
an obtaining module, configured to obtain a target text sequence corresponding to to-be-processed text information, the obtaining module being further configured to obtain a context vector according to the target text sequence;

a determination module, configured to determine a logical similarity corresponding to the target text sequence according to the context vector and the target text sequence that are obtained by the obtaining module; and an encoding module, configured to encode the target text sequence by using the logical similarity determined by the determination module to obtain a text encoding result.

Still another aspect of this disclosure provides a text translation apparatus, including a memory, a processor, and a bus system, the memory being configured to store a program;
the processor being configured to execute the program in the memory, to perform the following operations:
obtaining a target text sequence corresponding to target text information, the target text sequence including a plurality of elements;
obtaining a context vector according to the target text sequence;
determining a target query vector and a target key vector according to the context vector and the target text sequence, the target query vector having a correspondence with elements in the target text sequence, the target key vector having a correspondence with elements in the target text sequence;
determining a logical similarity corresponding to the target text sequence according to the target query vector and the target key vector;
encoding the target text sequence corresponding to the target text information by using the logical similarity to obtain a text encoding result; and
decoding the text encoding result to obtain a text translation result corresponding to the target text information; and
the bus system being configured to connect the memory and the processor, to enable the memory and the processor to communicate with each other.

Still another aspect of this disclosure provides an information processing apparatus, including a memory, a processor, and a bus system, the memory being configured to store a program;
the processor being configured to execute the program in the memory, to perform the following operations:
obtaining a target text sequence corresponding to to-be-processed text information;
obtaining a context vector according to the target text sequence;
determining a logical similarity corresponding to the target text sequence according to the context vector and the target text sequence; and
encoding the target text sequence by using the logical similarity to obtain a text encoding result; and
the bus system being configured to connect the memory and the processor, to enable the memory and the processor to communicate with each other.

Still another aspect of this disclosure provides a computer-readable storage medium, the computer-readable storage medium storing instructions, the instructions, when run on a computer, causing the computer to perform the method in the foregoing aspects.

Still another aspect of this disclosure provides an information processing apparatus, including:

an obtaining module, configured to obtain a text encoding result;
the obtaining module being further configured to obtain a target context vector according to the text encoding result;
a determination module, configured to determine a logical similarity corresponding to the text encoding result according to the target context vector and the text encoding result; and
a decoding module, configured to decode the text encoding result by using the logical similarity corresponding to the text encoding result to obtain a text decoding result.

Still another aspect of this disclosure provides an information processing apparatus, including a memory, a processor, and a bus system, the memory being configured to store a program;
the processor being configured to execute the program in the memory, to perform the following operations:
obtaining a text encoding result;
obtaining a target context vector according to the text encoding result;
determining a logical similarity corresponding to the text encoding result according to the target context vector and the text encoding result; and
decoding the text encoding result by using the logical similarity corresponding to the text encoding result to obtain a text decoding result; and
the bus system being configured to connect the memory and the processor, to enable the memory and the processor to communicate with each other.

Still another aspect of this disclosure provides a non-transitory computer readable medium storing a computer-readable program, when executed, causing a computer device to perform a plurality of steps. The steps comprise obtaining a target text sequence corresponding to to-be-processed text information; obtaining a context vector according to the target text sequence; determining a logical similarity corresponding to the target text sequence according to the context vector and the target text sequence; and encoding the target text sequence by using the logical similarity to obtain a text encoding result.

It can be seen from the foregoing technical solutions that the embodiments of this disclosure have the following advantages.

In the embodiments of this disclosure, an information processing method is provided. First, a target text sequence corresponding to to-be-processed text information is obtained, the target text sequence including a plurality of elements; a context vector is then obtained according to the target text sequence; a target query vector and a target key vector are then determined according to the context vector and the target text sequence, the target query vector having a correspondence with elements in the target text sequence, the target key vector having a correspondence with elements in the target text sequence; and finally, a logical similarity corresponding to the target text sequence is determined according to the target query vector and the target key vector, and the target text sequence corresponding to target text information is encoded by using the logical similarity to obtain a text encoding result. In the foregoing manner, a context vector related to a discrete sequence is used to encode the discrete sequence, to strengthen the dependence between elements in the discrete sequence, thereby enhancing the performance of a neural network model and improving the learning capability of the model.

DETAILED DESCRIPTION

Figure 1:
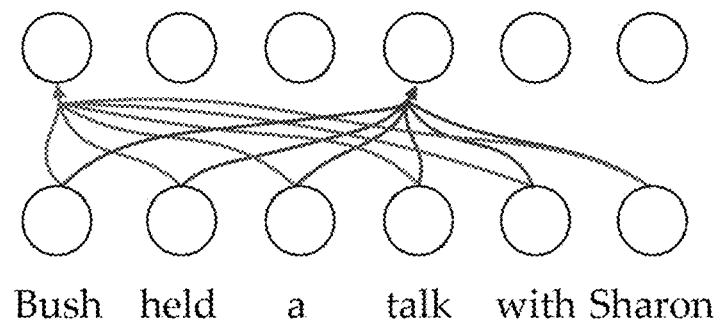
FIG. 1 is a schematic diagram of a basic architecture of modeling a discrete sequence using a self-attention neural network (SAN) model in the related technologies.

AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines and to enable the machines to have the functions of perception, reasoning, and decision-making.

The AI technology is a comprehensive discipline and relates to a wide range of fields including a hardware-level technology and a software-level technology. The basic AI technology generally includes technologies such as a sensor, a dedicated AI chip, cloud computing, distributed storage, a big data processing technology, an operating/interaction system, and electromechanical integration. AI software technologies mainly include several major directions such as a natural language processing (NLP) technology and machine learning (ML)/deep learning.

NLP is an direction in the fields of computer science and AI. It studies various theories and methods that enable effective communication between humans and computers in natural language. NLP is a science that integrates linguistics, computer science, and mathematics. Therefore, research in this field involves natural language, that is, a language that people use daily, so it is closely related to the study of linguistics. NLP technologies usually include text processing, semantic understanding, machine translation, robot question answering, knowledge graphs, and other technologies.

ML is a multi-disciplinary subject involving a plurality of disciplines such as probability theory, statistics, approximation theory, convex analysis, and algorithm complexity theory. ML specializes in studying how a computer simulates or implements a human learning behavior to obtain new knowledge or skills, and reorganize an existing knowledge structure to keep improving its performance. ML is the core of the AI, is a basic way to make the computer intelligent, and is applied to various fields of AI. ML and deep learning generally include technologies such as an artificial neural network, a belief network, reinforcement learning, transfer learning, inductive learning, and learning from demonstrations.

With the research and progress of the AI technology, the AI technology is studied and applied to a plurality of fields, such as a common virtual assistant, a smart speaker, and a smart customer service. It is believed that with the development of technologies, the AI technology will be applied to more fields and play an increasingly important role.

Some embodiments of this disclosure provide a text translation method, an information processing method and apparatuses. A context vector related to a discrete sequence is used to encode the discrete sequence and to strengthen the dependence between elements in the discrete sequence. Thereby, the performance of a neural network model is enhanced, and the learning capability of the model is improved.

In the specification, claims, and accompanying drawings of this disclosure, the terms "first," "second," "third," "fourth," and the like (if existing) are intended to distinguish between similar objects rather than describe a specific sequence or a precedence order. It is to be understood that data used in this way is exchangeable in a proper case, so that the embodiments of this disclosure described herein can be implemented in an order different from the order shown or described herein. Moreover, the terms "include," "contain," and any other variants mean to cover the non-exclusive inclusion. For example, a process, method, system, product, or device that includes a list of steps or units is not necessarily limited to those steps or units that are expressly listed, but it may include other steps or units not expressly listed or inherent to such a process, method, system, product, or device.

It is to be understood that a SAN model provided in this disclosure is a neural network structure model based on a self-attention mechanism. The application based on the SAN model is also very extensive. The SAN model calculates an attention weight for each element pair in a discrete sequence by using, such as, question answering systems, acoustic modeling, natural language inference, sentence classification, text translation, and the like. Therefore, compared with a recurrent neural network (RNN) in a conventional sequence modeling method, the SAN model may capture long-distance dependencies more directly. For example, in a new-generation neural machine translation (NMT) architecture, the translation can fully use the attention mechanism, and it achieves better translation quality than an neural machine translation system that uses RNN for modeling in the translation task of multiple language pairs.

Figure 2:
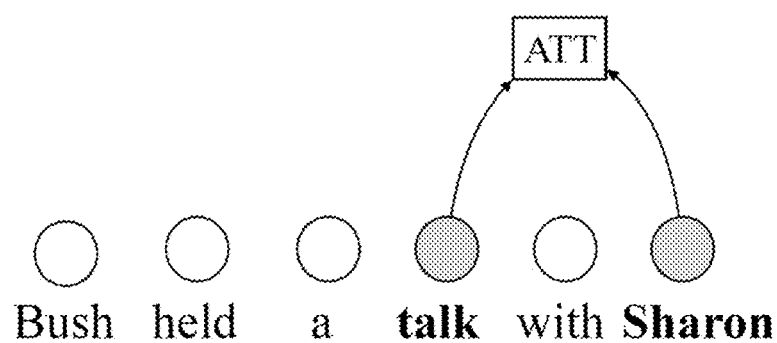
FIG. 2 is a schematic diagram showing the relationship between two words in a SAN model in the related technologies.

FIG. 1 is a schematic diagram of the architecture of modeling a discrete sequence using a SAN model in related technologies. The SAN model can directly calculate the dependence between hidden states in a neural network. A direct connection is established between each upper-layer network representation and a lower-layer network representation. A SAN model specializes in capturing the dependence between elements. FIG. 2 is a schematic diagram showing the relationship between two words in a SAN model in solutions in related technologies. As shown in the figure, in a SAN model using an attention mechanism, only the relationship between two words is considered to calculate the dependence between the two words (such as "talk" and "Sharon" in FIG. 2). However, it is found through research that context information is capable of enhancing the dependence between network representations. Especially, for an attention model, the use of context information can enhance the SAN model. In addition, in this disclosure, internal elements of a discrete sequence are used to represent context information to avoid dependence on external resources, thereby greatly improving the simplicity and flexibility of the SAN model and easy deployment and implementation.

Figure 3:
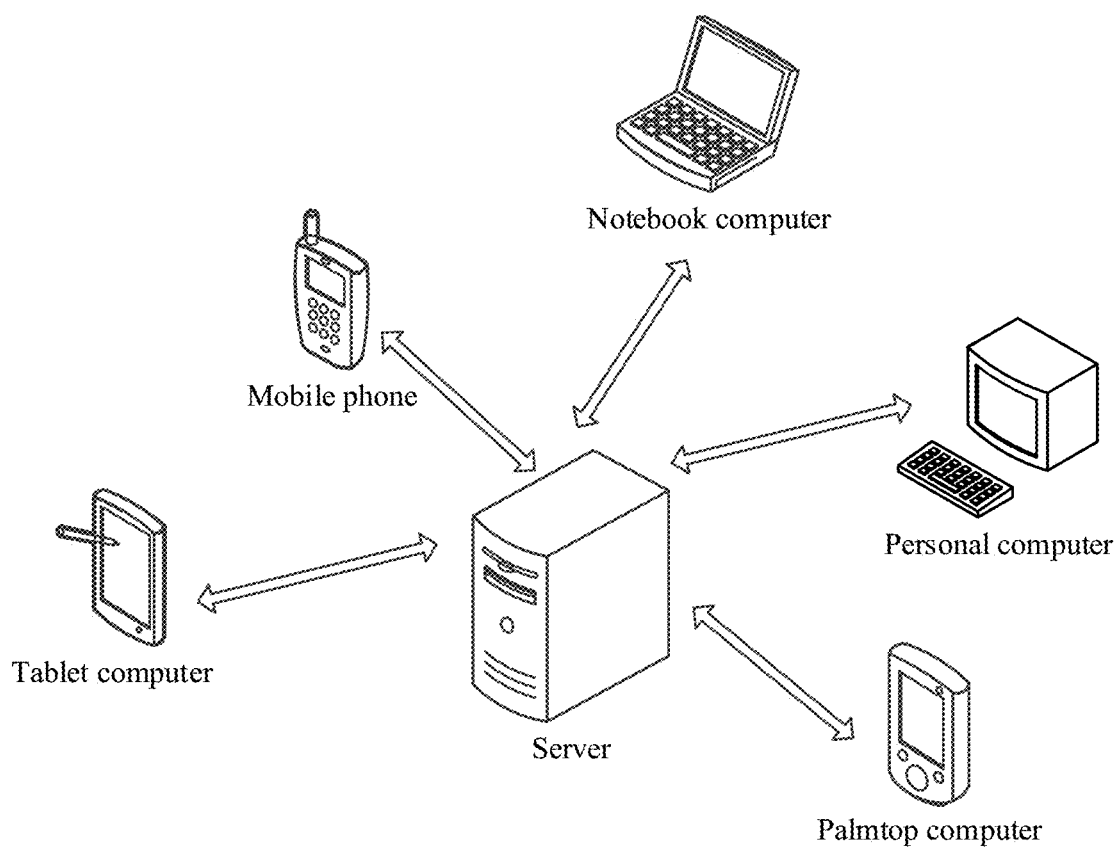
FIG. 3 is a schematic diagram of the architecture of a text translation system according to an embodiment of this disclosure.

The application of the SAN model to a text translation scenario is used as an example for description below. FIG. 3 is a schematic diagram of the architecture of a text translation system according to an embodiment of this disclosure. As shown in the figure, a SAN model provided in this disclosure is deployed on a server. After a terminal device transmits text information to the server, the server encodes and decodes the text information to generate a translation result. The server then transmits the translation result to the terminal device, and the terminal device displays the translation result. In an embodiment, during the actual application, the SAN model may be deployed on the terminal device. That is, when the terminal device is offline, the SAN model may still be used to translate text information to generate a translation result. Then, the terminal device displays the translation result. It may be understood that the terminal device includes, but not limited to, a tablet computer, a mobile phone, a notebook computer, a personal computer (PC), and a palm computer.

The SAN model provided in this disclosure generally includes four text processing steps, namely, generating word vectors, encoding, applying an attention mechanism, and predicting. First, in the first step, high-dimensional sparse binary vectors are mapped into low-dimensional dense vectors in a word vector table. For example, assuming that a received text is a string of American Standard Code for Information Interchange (ASCII) characters and has 256 possible values, each possible value is represented as a 256-dimensional binary vector. Only the value of the $97^{th}$ dimension of the vector of a character "a" is equal to 1, and the values of other dimensions are all equal to 0. Only the value of the $98^{th}$ dimension of the vector of a character "b" is equal to 1, and the values of other dimensions are all equal to 0. This representation method is referred to as a "one hot" form. The vector representations of different characters are completely different. In most neural network models, an input text is first divided into several words, and the words are then represented by using word vectors. Other models extend a word vector representation with other information. For example, in addition to the identification of a word, a string of tags is also entered. Next, tag vectors may be obtained through learning, and the tag vectors are concatenated into a word vector. This may allow the addition of some position-sensitive information to the word vector representation.

In the second step, assuming that the sequence of the word vector is obtained, the encoding step is to convert the sequence of the word vector into a sentence matrix, and each row of the matrix represents the meaning of each word in the context. A bidirectional RNN model may be used in this step. Certainly, the model effects of long short-term memory (LSTM) and gated recurrent unit (GRU) structures are adequate. Each row of vectors is calculated in two parts: The first part is forward calculation, and the second part is reverse calculation. The two parts are then concatenated into a complete vector.

In the third step, the matrix obtained in the second step is compressed into a vector representation, so that the vector representation may be transmitted into a standard feedforward neural network for prediction. The advantage of the attention mechanism over other compression methods is that an auxiliary context vector is inputted. Finally, in the prediction step, after text content is compressed into a vector, a final target representation, that is, a category tag, a real value, or a vector, may be learned. A network model may be considered as a state machine controller, for example, a transition-based parser, to make structured predictions.

Figure 4:
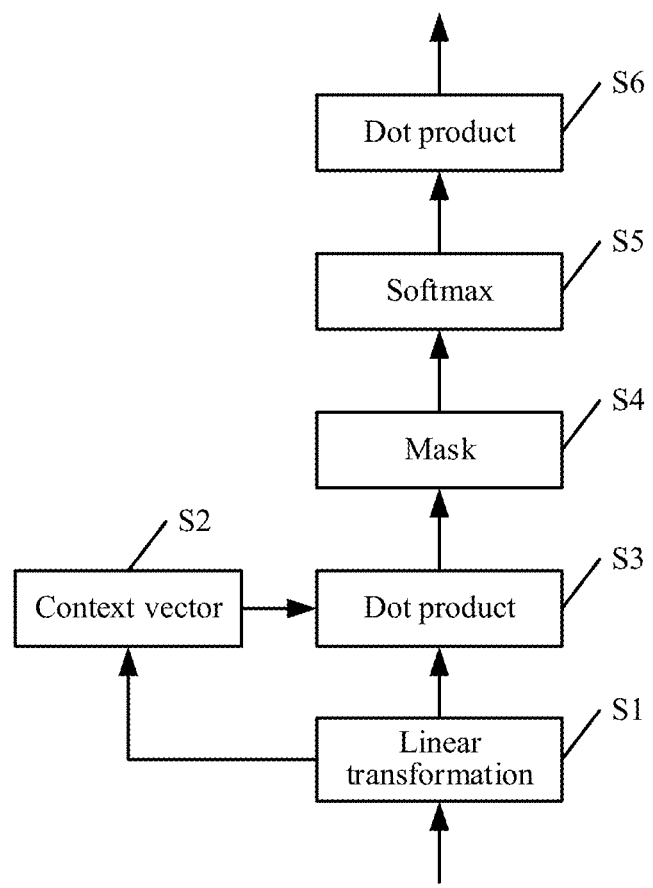
FIG. 4 is a schematic flowchart of the calculation of a SAN model according to an embodiment of this disclosure.

For ease of understanding, FIG. 4 is a schematic flowchart of the calculation of a SAN model according to an embodiment of this disclosure. As shown in the figure, in a calculation method based on a SAN model, a process of generating a network representation of each element is as follows:

In step S1, an input sequence is given, and the first layer of network of the SAN model converts discrete elements in the input sequence into a continuous spatial representation.

A masking layer is an optional layer. Since all input sequences may have inconsistent lengths in actual operation, all the input sequences may be set as sequences with the same length through the masking layer. That is, the longest sequence is used as the standard, and a shorter sequence is set in a zero-padding manner to a length the same as the length of the longest sequence.

In step S2, a context vector is generated according to a spatial representation of the input sequence.

In step S3, three different learnable parameter matrices are used to linearly change the spatial representation of the input sequence to obtain a query vector sequence, a key vector sequence, and a value vector sequence. Then, a logical similarity between a query and each key-value pair is modeled by using a dot product in combination with the context vector.

In step S4, the logical similarity is normalized to obtain a weight between the query and each key-value pair.

Each element in the input sequence is normalized. Assuming that there are five elements, the sum of the weights of these five elements after normalization is 1.

In step S5, an output vector of a current element is obtained from weighted summation of each value according to the weight calculated in step S4, and a dot product of the weight and the value is calculated in actual calculation.

Figure 5:
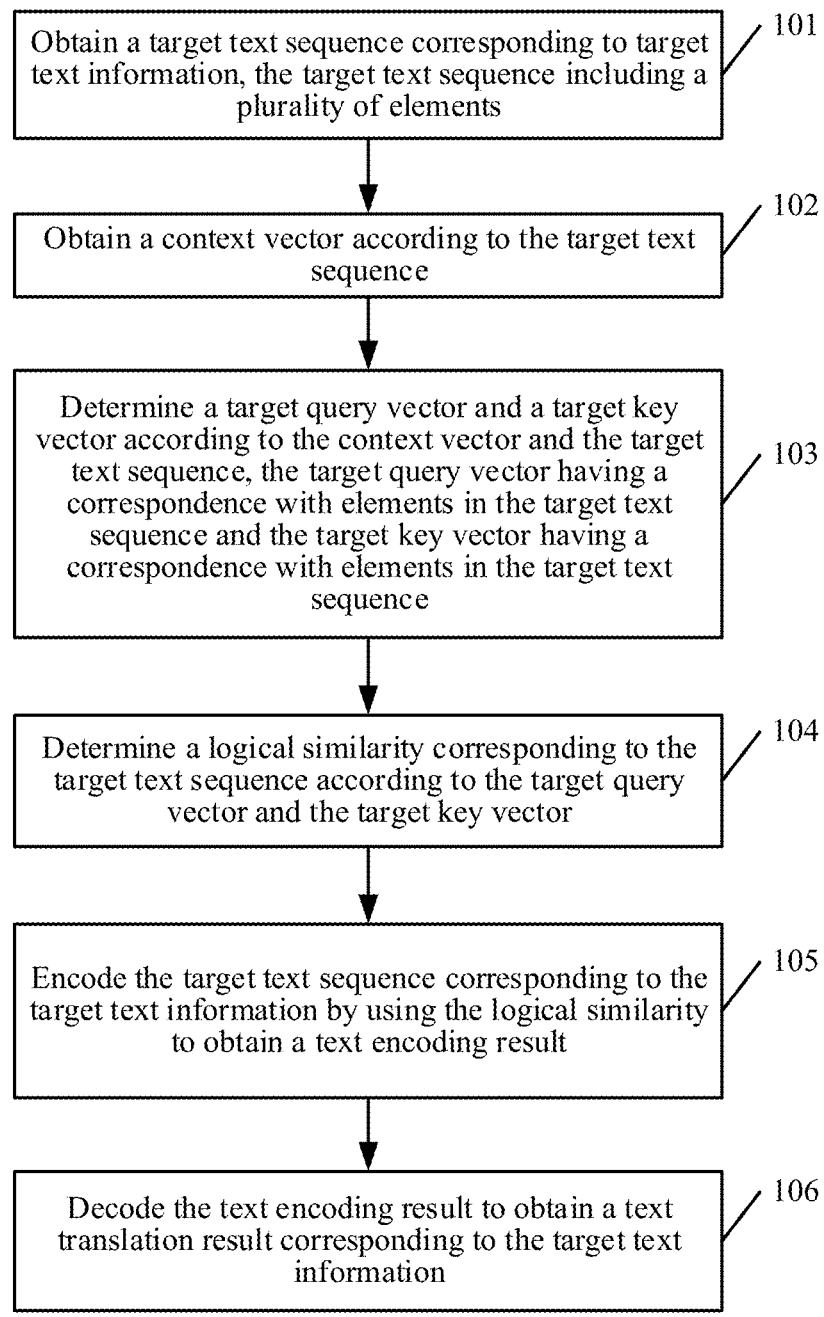
FIG. 5 is a schematic diagram of an embodiment of a text translation method according to an embodiment of this disclosure.

This embodiment of this disclosure provides a context enhancement model that does not need to introduce additional information (for example, context information), thereby improving the performance of a self-attention network. A text translation method in this disclosure is described below. Referring to FIG. 5, an embodiment of a text translation method in this embodiment of the present disclosure includes the following steps:

Step 101: Obtain a target text sequence corresponding to target text information, the target text sequence including a plurality of elements.

In this embodiment, to-be-processed text information is first obtained. The to-be-processed text information may be a discrete input sequence, for example, H={$h_1, \ldots, h_J$}. An embedding layer of a neural network is then used to convert discrete elements into a continuous spatial representation, that is, the target text sequence.

The embedding layer is used to convert input information into a vector at the beginning layer of the neural network. The first step of using the embedding layer is to encode the to-be-processed text information by indexing and assign an index to each piece of different to-be-processed text information. Next, an embedding matrix is created to determine how many "latent factors" need to be assigned to each index, which means how long a vector is desired, so that the embedding matrix may be used to represent the to-be-processed text information instead of a huge encoding vector.

Step 102: Obtain a context vector according to the target text sequence.

In this embodiment, a corresponding context vector is generated according to the target text sequence. The context vector is learned from the internal representation in the network, thereby ensuring the simplicity and ease of use of the SAN model. During actual disclosure, there are three ways to represent the context vector. A current layer representation is used to calculate a global context vector; a history layer representation is used to calculate a syntax-semantic context vector; and a history layer global context vector is used to simultaneously obtain global information and a syntax-semantic context representation.

Step 103: Determine a target query vector and a target key vector according to the context vector and the target text sequence, the target query vector having a correspondence with elements in the target text sequence and the target key vector having a correspondence with elements in the target text sequence.

In this embodiment, the target query vector and the target key vector are determined according to the context vector and the target text sequence. The target query vector has a correspondence with elements in the target text sequence, and the target key vector has a correspondence with elements in the target text sequence. For example, $Q_1$ in the target query vector corresponds to the target text sequence $h_1$, and $K_1$ in the target key vector corresponds to the target text sequence $h_1$.

Step 104: Determine a logical similarity corresponding to the target text sequence according to the target query vector and the target key vector.

In this embodiment, the logical similarity corresponding to the target text sequence is generated according to the target query vector and the target key vector. It can be seen from the above steps that the target query vector includes a plurality of elements, that the target key vector also includes a plurality of elements, and that each element has a correspondence with elements in the target text sequence. Therefore, when determining the logical similarity corresponding to the target text sequence, each element in the target query vector is associated with each element in the target key vector. For example, the logical similarity is represented as e, and $e_{ij}$ represents the similarity between an $i^{th}$ element in the target query vector and a $j^{th}$ element in the target key vector.

Step 105: Encode the target text sequence corresponding to the target text information by using the logical similarity to obtain a text encoding result.

In this embodiment, the logical similarity is used to encode the target text sequence corresponding to the target text information. Assuming that the target text information is "Today is a nice day", the five elements (words) in the sentence need to be converted to obtain the target text sequence. The logical similarity is then used to perform first encoding on the target text sequence, second encoding may further be performed based on the first encoding, and so on. Assuming a five-layer network, the target text sequence needs to be encoded five times until a text encoding result is eventually outputted.

Step 106: Decode the text encoding result to obtain a text translation result corresponding to the target text information.

In this embodiment in the scenario of translation, after a source end encodes the target text sequence, the text encoding result is transmitted to a destination end, and the destination end decodes the text encoding result. During decoding, elements (words) are usually generated one by one. That is, one word is generated after each decoding. The text encoding result is a representation of a word vector and a context vector of a word. The word vector and the context vector are used to calculate a new network vector representation. A word is then obtained after the network vector representation passes through a softmax layer. This word is then used to calculate a next word until the translation result of the target text information is outputted. For example, the result of "Today is a nice day" will be translated into a sentence with the same or similar meaning in Chinese.

In this embodiment of the present disclosure, a text translation method is provided. First, a target text sequence corresponding to target text information is obtained, the target text sequence including a plurality of elements. A context vector is obtained according to the target text sequence. A target query vector and a target key vector are determined according to the context vector and the target text sequence, in which the target query vector has a correspondence with elements in the target text sequence, and the target key vector has a correspondence with elements in the target text sequence. A logical similarity corresponding to the target text sequence is determined according to the target query vector and the target key vector. The target text sequence corresponding to target text information is encoded by using the logical similarity to obtain a text encoding result, and the text encoding result is decoded to obtain a text translation result corresponding to the target text information. In the foregoing manner, a context vector related to a discrete sequence is used to encode the discrete sequence, to strengthen the dependence between elements in the discrete sequence, so that a network representation between different words can be flexibly learned by using context information, thereby improving the quality of machine translation.

Figure 6:
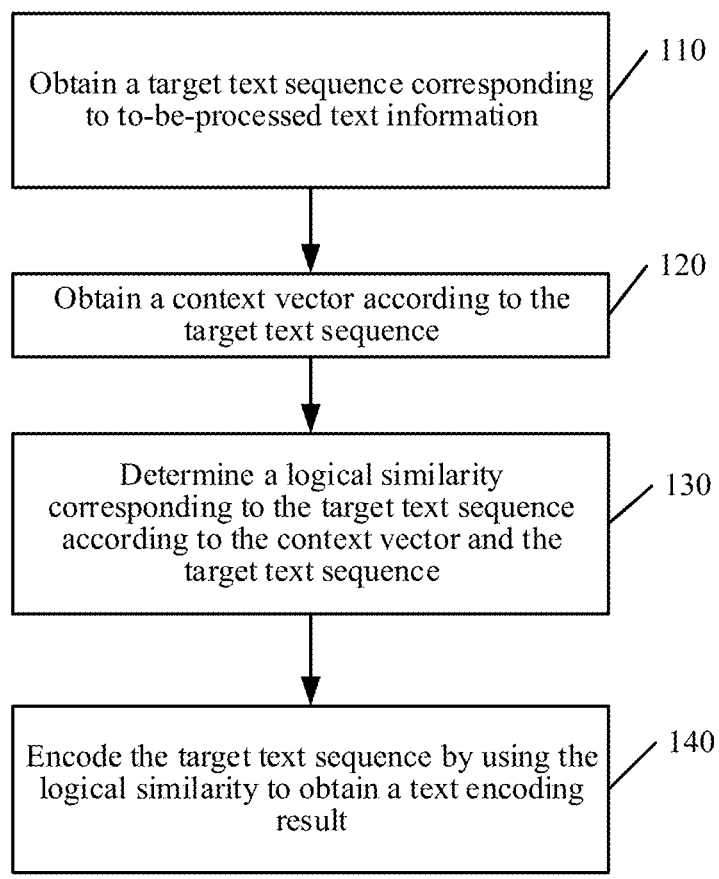
FIG. 6 is a schematic diagram of an embodiment of an information processing method according to an embodiment of this disclosure.

The information processing method in this disclosure is described below. The information processing method provided in this embodiment of this disclosure is applied to a computer device. The computer device is an electronic device with computing and processing capabilities. For example, the computer device may be a terminal or a server. The terminal may be a mobile phone, a tablet computer, a PC, or the like. The server may be a server or a server cluster formed by a plurality of servers. As shown in FIG. 6, the information processing method provided in this embodiment of this disclosure includes the following steps:

Step 110. Obtain a target text sequence corresponding to to-be-processed text information.

In this embodiment of this disclosure, the to-be-processed text information may be any piece of text information. The to-be-processed text information may be a discrete sequence. The target text sequence corresponding to the to-be-processed text information may be obtained by inputting the to-be-processed text information into an embedding layer of the neural network. For example, the target text sequence is a continuous spatial representation.

Step 120. Obtain a context vector according to the target text sequence.

In this embodiment of this disclosure, the context vector is used for representing the context information corresponding to the target text sequence, and the context vector is obtained according to the target text sequence without introducing additional information, for example, context information.

Step 130. Determine a logical similarity corresponding to the target text sequence according to the context vector and the target text sequence.

The logical similarity is used for characterizing the similarity between a query and a key. The logical similarity corresponding to the target text sequence is determined by using the context vector, so that a final calculated target text sequence incorporates context information.

Step 140. Encode the target text sequence by using the logical similarity to obtain a text encoding result.

The target text sequence is encoded by using the logical similarity with context information, so that the text encoding result is more accurate.

This embodiment of this disclosure is described by using only an example in which the information processing method is applied to the field of machine translation. In other possible implementations, the information processing method provided in this embodiment of this disclosure is also applicable to other tasks using self-attention network model language information, for example, language models, sentence classification, language reasoning, question answering, and dialog systems. The application field of the information processing method is not limited in this embodiment of this disclosure.

In summary, in the technical solution provided in this embodiment of this disclosure, a target text sequence corresponding to to-be-processed text information is obtained; a context vector is obtained according to the target text sequence; a logical similarity corresponding to the target text sequence is determined according to the context vector and the target text sequence; and the target text sequence is encoded by using the logical similarity to obtain a text encoding result. In the foregoing manner, a context vector related to a discrete sequence is used to encode the discrete sequence, to strengthen the dependence between elements in the discrete sequence, thereby enhancing the performance of a neural network model and improving the learning capability of the model.

Figure 7:
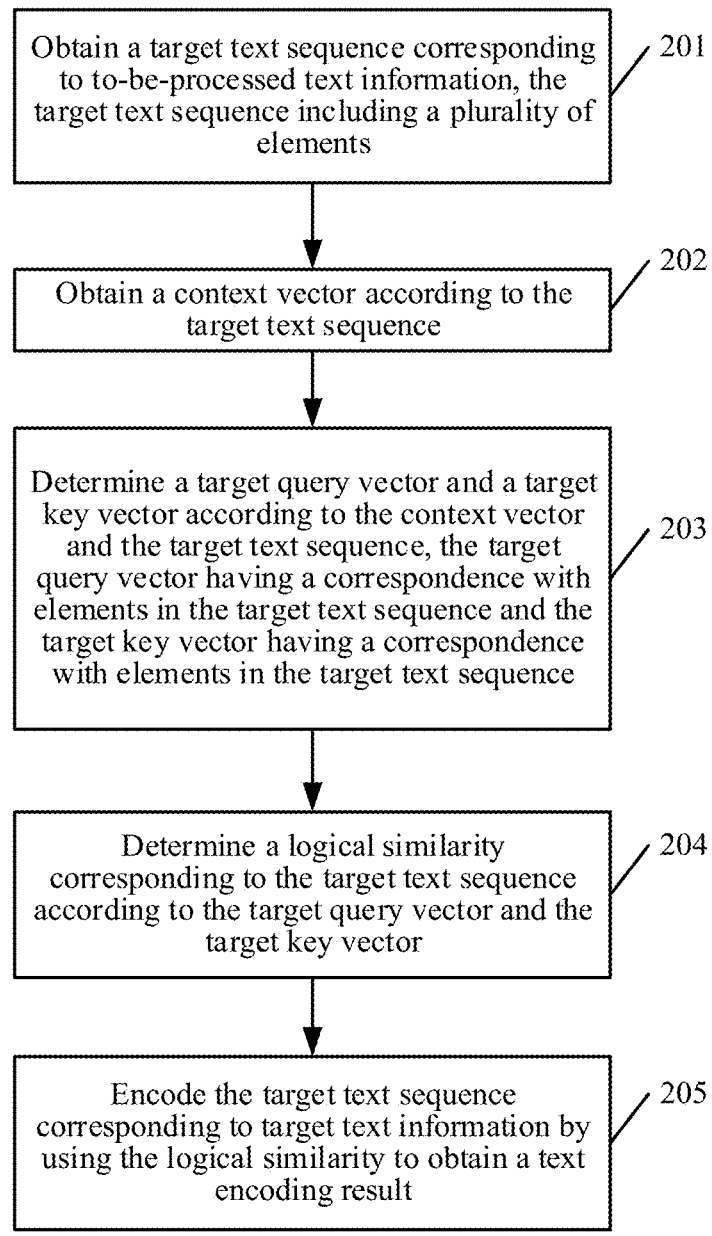
FIG. 7 is a schematic diagram of another embodiment of an information processing method according to an embodiment of this disclosure.

An information processing method in this disclosure is described below. Referring to FIG. 7, another embodiment of an information processing method in this embodiment of this disclosure includes the following steps:

Step 201: Obtain a target text sequence corresponding to to-be-processed text information, the target text sequence including a plurality of elements.

In this embodiment, to-be-processed text information is first obtained. The to-be-processed text information may be a discrete input sequence, for example, $H=\{h_1, \ldots, h_I\}$. An embedding layer of a neural network is then used to convert discrete elements into a continuous spatial representation, that is, the target text sequence.

The embedding layer is used to convert input information into a vector at the beginning layer of the neural network. The first step of using the embedding layer is to encode the to-be-processed text information by indexing and assign an index to each piece of different to-be-processed text information. Next, an embedding matrix is created to determine how many "latent factors" need to be assigned to each index, which means how long a vector is desired, so that the embedding matrix may be used to represent the to-be-processed text information instead of a huge encoding vector.

Step 202: Obtain a context vector according to the target text sequence.

In this embodiment, a corresponding context vector is generated according to the target text sequence. The context vector is learned from the internal representation in the network, thereby ensuring the simplicity and ease of use of the SAN model. During actual disclosure, there are three ways to represent the context vector. A current layer representation is used to calculate a global context vector, a history layer representation is used to calculate a syntax-semantic context vector, and a history layer global context vector is used to simultaneously obtain global information and a syntax-semantic context representation.

Step 203: Determine a target query vector and a target key vector according to the context vector and the target text sequence, in which the target query vector has a correspondence with elements in the target text sequence and the target key vector has a correspondence with elements in the target text sequence.

In this embodiment, the target query vector and the target key vector are determined according to the context vector and the target text sequence. The target query vector has a correspondence with elements in the target text sequence, and the target key vector has a correspondence with elements in the target text sequence. For example, $Q_1$ in the target query vector corresponds to the target text sequence $h_1$, and $K_1$ in the target key vector corresponds to the target text sequence $h_1$.

Step 204: Determine a logical similarity corresponding to the target text sequence according to the target query vector and the target key vector.

In this embodiment, the logical similarity corresponding to the target text sequence is generated according to the target query vector and the target key vector. It can be seen from the above steps that the target query vector includes a plurality of elements, the target key vector also includes a plurality of elements, and each element has a correspondence with elements in the target text sequence. Therefore, when determining the logical similarity corresponding to the target text sequence, each element in the target query vector is associated with each element in the target key vector. For example, the logical similarity is represented as e, and $e_{i,j}$ represents the similarity between an $i^{th}$ element in the target query vector and a $j^{th}$ element in the target key vector.

Step 205: Encode the target text sequence corresponding to target text information by using the logical similarity to obtain a text encoding result.

In this embodiment, the logical similarity is used to encode the target text sequence corresponding to the target text information. Assuming that the target text information is "Today is a nice day", the five elements (words) in the sentence need to be converted to obtain the target text sequence. The logical similarity is then used to perform first encoding on the target text sequence. Second encoding may further be performed based on the first encoding, and so on. Assuming a five-layer network, the target text sequence needs to be encoded five times until a text encoding result is eventually outputted.

In this embodiment of this disclosure, the information processing method is provided. First, a target text sequence corresponding to to-be-processed text information is obtained, the target text sequence including a plurality of elements; a context vector is then obtained according to the target text sequence; a target query vector and a target key vector are then determined according to the context vector and the target text sequence, the target query vector having a correspondence with elements in the target text sequence, the target key vector having a correspondence with elements in the target text sequence; and finally, a logical similarity corresponding to the target text sequence is determined according to the target query vector and the target key vector, and the target text sequence corresponding to target text information is encoded by using the logical similarity to obtain a text encoding result. In the foregoing manner, a context vector related to a discrete sequence is used to encode the discrete sequence, to strengthen the dependence between elements in the discrete sequence, thereby enhancing the performance of a neural network model and improving the learning capability of the model.

Based on the embodiment corresponding to FIG. 7, in an exemplary embodiment of the information processing method provided in this embodiment of this disclosure, the step of obtaining a context vector according to the target text sequence may include:

1. obtaining a vector of each element in the target text sequence; and
2. calculating an average value of the target text sequence according to the vector of the each element in the target text sequence, the average value being used for representing the context vector.

In this embodiment, a method for globally generating a context vector by using a target text sequence is described. Specifically, a context vector corresponding to all elements in a target text sequence is determined by a unified context vector, which requires summarization of the information represented by all elements in a layer.

Figure 8:
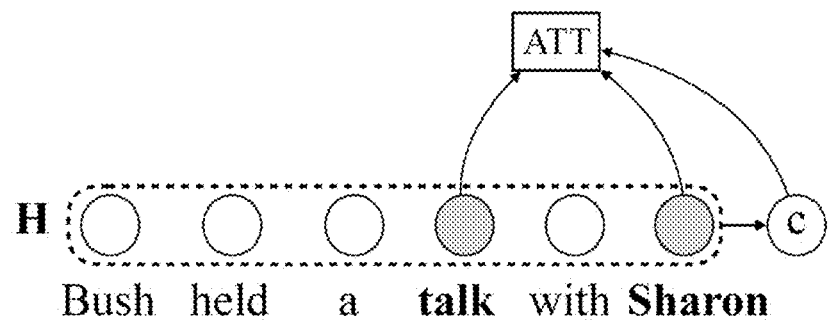
FIG. 8 is a schematic diagram of an embodiment of a global context vector according to an embodiment of this disclosure.

A conventional self-attention network calculates an attention weight between two elements (for example, "talk" and "Sharon") separately without considering the overall information of the target text sequence. This embodiment of this disclosure considers the impact of the entire target text sequence on each element. FIG. 8 is a schematic diagram of an embodiment of a global context vector in this embodiment of this disclosure. As shown in the figure, the average value in the target text sequence is used as the representation of an input layer. The context vector herein is not a matrix because it is obtained after averaging calculation of a layer of target text sequence. Specifically, a target text sequence H is first obtained. H includes a plurality of elements, that is, $H=\{h_1, \ldots, h_I\}$, with 1 to I elements. The average value of the target text sequence is then calculated according to the vector of each element in the target text sequence. That is, the average value is calculated by using the following formula:

$$c=\overline{H},$$

where c represents the average value of the target text sequence, and the average value is the context vector.

Assuming that the target text sequence includes three elements A, B, and C, A, B, and C are all vectors. An average value obtained by using (A+B+C)/3 may be used as the context vector. In other possible implementations, in this case, the relationships between the following elements need to be obtained: A and A, A and B, A and C, B and A, B and B, B and C, C and A, C and B, and C and C. The average value is calculated according to the vector relationships between these elements, and the average value is used as the context vector.

In the above embodiment, the context vector is only obtained by averaging the vectors of the elements in a target inverse text sequence. In other possible implementations, the context vector may be obtained by seeking the maximum value or other linear changes. This embodiment of this disclosure does not limit the manner of obtaining a context vector.

Second, in this embodiment of this disclosure, a method for obtaining a context vector based on a global text sequence is provided. That is, a vector of each element in the target text sequence is obtained. An average value of the target text sequence is calculated according to the vector of each element in the target text sequence. The average value is represented as the context vector. In the foregoing manner, the context vector may be obtained through the entire text sequence, to provide a feasible manner of implementing the solution, thereby improving the operability of the solution.

In addition, the method for obtaining a context vector provided in this embodiment of this disclosure has simple operations and a fast calculation speed.

Based on the embodiment corresponding to FIG. 7, in an exemplary embodiment of the information processing method provided in this embodiment of this disclosure, the obtaining a context vector according to the target text sequence may include:

1. obtaining L layers of text sequences generated before the target text sequence, L being an integer greater than or equal to 1; and
2. generating the context vector according to the L layers of text sequences.

For example, the L layers of text sequences are concatenated to generate a context vector. In other possible implementations, the context vector may be generated according to the L layers of text sequences by using a convolutional neural network, an RNN, or a gated unit and a variant thereof, or a simple linear transformation.

Figure 9:
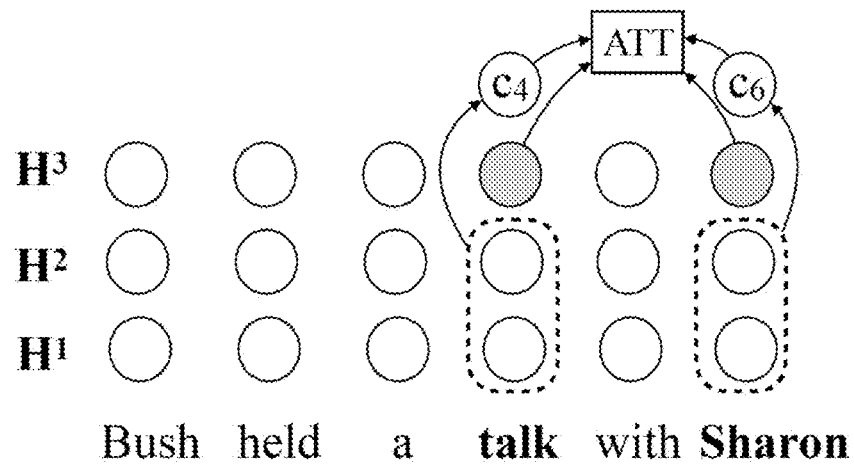
FIG. 9 is a schematic diagram of an embodiment of a depth context vector according to an embodiment of this disclosure.

In this embodiment, a method for deeply generating a context vector by using a target text sequence is described. Specifically, a neural network model usually has a plurality of layers of networks, and a depth context vector represents a plurality of layers of networks that interact with each other. For ease of description, FIG. 9 is a schematic diagram of an embodiment of a depth context vector according to an embodiment of this disclosure. As shown in the figure, assuming that the target text sequence is an $(L+1)^{th}$ layer, it is necessary to obtain inputs of all preceding layers, that is, text sequences of the first layer to an $L^{th}$ layer. The plurality of layers of text sequences are concatenated to obtain a depth context vector C:

$$C=[H^1, \ldots, H^L].$$

The context vector C herein is a matrix. $H^1$ in FIG. 9 represents the text sequence of the first layer of network, $H^2$ represents the text sequence of the second layer of network, and $H^3$ represents the target text sequence of the current layer. For "talk" and "Sharon", it is equivalent to that the bottom two layers of networks are concatenated together. If the dimension of each layer of network is 512, the dimension obtained after concatenation is 1024, that is, the depth $d_c=n\times L d$, where n represents the number of vectors in one layer of network, L represents the number of network layers generated before the target text sequence, and d represents the dimension of the inputted hidden state.

Second, in this embodiment of this disclosure, a method for obtaining a context vector based on a depth text sequence is provided. That is, L layers of text sequences corresponding to the target text sequence are first obtained, the L layers of text sequences being network layers generated before the target text sequence, L being an integer greater than or equal to 1; and the context vector is then generated according to the L layers of text sequences. In the foregoing manner, the context vector may be obtained by using the plurality of depth text sequences, to provide a feasible manner of implementing the solution, thereby improving the operability of the solution.

Based on the embodiment corresponding to FIG. 7, in an exemplary embodiment of the information processing method provided in this embodiment of this disclosure, the step of obtaining a context vector according to the target text sequence may include:

1. obtaining L layers of text sequences corresponding to the target text sequence, the L layers of text sequences being network layers generated before the target text sequence, L being an integer greater than or equal to 1;
2. obtaining L layers of first context vectors according to the L layers of text sequences, each layer of first context vector being an average value of elements in each layer of text sequence;
3. obtaining a second context vector according to the target text sequence, the second context vector being an average value of elements in the target text sequence; and
4. calculating the context vector according to the L layers of first context vectors and the second context vector.

Figure 10:
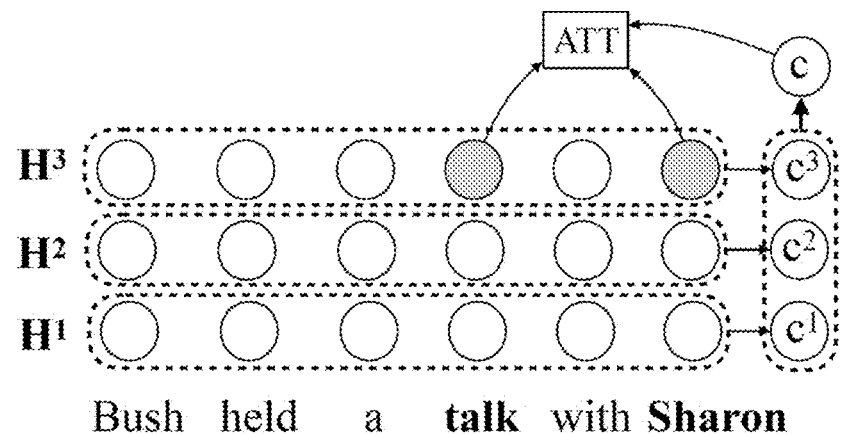
FIG. 10 is a schematic diagram of an embodiment of a depth-global context vector according to an embodiment of this disclosure.

In this embodiment, a method for deeply generating a context vector by using a target text sequence and globally generating a context vector by using a target text sequence is described. Specifically, a neural network model usually has a plurality of layers of networks, a depth context vector represents a plurality of layers of networks that interact with each other, and a global context vector represents information represented by all elements in a target text sequence. For ease of description, FIG. 10 is a schematic diagram of an embodiment of a depth-global context vector according to an embodiment of this disclosure. As shown in the figure, assuming that the target text sequence is the $(L+1)^{th}$ layer, it is necessary to obtain inputs of all preceding layers, that is, text sequences of the first layer to the $L^{th}$ layer. It is necessary to use the manner provided in an exemplary embodiment corresponding to FIG. 7 to calculate a global context vector of each layer of text sequence, to obtain $\{c^1, \ldots, c^L\}$, where $c^1$ represents the average value of elements in the first layer of text sequence, referred to as a first context vector, and $c^2$ represents the average value of elements in the second layer of text sequence, and also referred to as the first context vector. Finally, it is necessary to obtain the average value of the elements in the target text sequence corresponding to the current layer, that is, $c^{L+1}$, where $c^{L+1}$ is referred to as the second context vector.

The plurality of layers of context vector representations are concatenated to obtain a depth-global context vector c of $(L+1)d$ dimensions, that is, $c=[c^1, \ldots, c^{L+1}]$; where c herein is a vector rather than a matrix.

Second, in this embodiment of this disclosure, a method for obtaining a context vector based on depth and global text sequences is provided. That is, L layers of first context vectors are first obtained according to the L layers of text sequences, each layer of first context vector being an average value of elements in each layer of text sequence. The second context vector is then obtained according to the target text sequence, the second context vector being an average value of elements in the target text sequence. Finally, the context vector is calculated according to the L layers of first context vectors and the second context vector. In the foregoing manner, the context vector may be obtained by using the plurality of depth-global text sequences, to provide a feasible manner of implementing the solution, thereby improving the operability of the solution.

Based on FIG. 7 and any one of the foregoing embodiments corresponding to FIG. 7, in an exemplary embodiment of the information processing method provided in this embodiment of this disclosure, the determining a target query vector and a target key vector according to the context vector and the target text sequence may include:

calculating an original query vector, an original key vector, and an original value vector according to the target text sequence, the original value vector being used for determining a target output vector corresponding to the target text sequence;

calculating a query vector scalar and a key vector scalar according to the context vector, the original query vector, and the original key vector; and calculating the target query vector and the target key vector according to the context vector, the query vector scalar, and the key vector scalar.

In this embodiment, how to generate the target query vector and the target key vector in combination with the context vector is described. In this disclosure, a self-attention model is proposed, and the model may incorporate a context vector based on a text sequence. First, the original query vector, the original key vector, and the original value vector are calculated according to the target text sequence, the original value vector being used for determining the target output vector corresponding to the target text sequence. The query vector scalar and the key vector scalar may then be calculated according to the context vector, the original query vector, and the original key vector. The scalar is represented between 0 and 1 and is used for controlling the strength relationship between the context vector and the original query vector and the strength relationship between the context vector and the original value vector. In the range of 0 to 1, a larger scalar indicates stronger correlation.

Finally, the target query vector and the target key vector are calculated according to the context vector, the query vector scalar, and the key vector scalar.

Next, in this embodiment of this disclosure, a manner of determining the target query vector and the target key vector according to the context vector and the target text sequence is described. That is, the original query vector, the original key vector, and the original value vector are first calculated according to the target text sequence. The query vector scalar and the key vector scalar are then calculated according to the context vector, the original query vector, and the original key vector. Finally, the target query vector and the target key vector are calculated according to the context vector, the query vector scalar, and the key vector scalar. In the foregoing manner, the context vector is incorporated into the target query vector and the target key vector, to enhance the feature representation of the original query vector and the original key vector, thereby strengthening the network representation of the entire text sequence and improving the model learning performance.

In this embodiment according to specific formulas, the original query vector, the original key vector, and the original value vector are calculated, the query vector scalar and the key vector scalar are calculated, and the target query vector and the target key vector are calculated.

In this embodiment of this disclosure, the query vector scalar is used for controlling the strength relationship between the context vector and the original query vector, and the key vector scalar is used for controlling the strength relationship between the context vector and the original key vector.

Specifically, the sequence represented by a source end vector needs to be generated first. That is, the target text sequence $H=\{h_1, \ldots, h_T\}$ corresponding to the to-be-processed text information is obtained, and the output of the lower layer is then used as the input of the current layer. The original query vector, the original key vector, and the original value vector are calculated in the following manner:

$$\begin{bmatrix} Q \\ K \\ V \end{bmatrix} = H \begin{bmatrix} W_Q \\ W_K \\ W_V \end{bmatrix},$$

where Q represents the original query vector, K represents the original key vector, V represents the original value vector, H represents the target text sequence, $W_Q$ represents a first parameter matrix, $W_K$ represents a second parameter matrix, $W_V$ represents a third parameter matrix, and the first parameter matrix, the second parameter matrix, and the third parameter matrix are pre-trained parameter matrices, that is, $\{W_Q, W_K, W_V\}$ are all trainable parameter matrices. The parameter matrix may be represented as d×d. d represents the dimension of the inputted hidden state (a value such as 512 or 1024 may be used, which is not limited herein). Certainly, during actual application, the parameter matrix may also be represented as $d_1 \times d_2$.

Based on the original query vector Q and the original key vector K obtained above, the query vector scalar and the key vector scalar may be calculated in combination with the context vector, that is, $$\begin{bmatrix} \lambda_Q \\ \lambda_K \end{bmatrix} = \sigma\left(\begin{bmatrix} Q \\ K \end{bmatrix}\begin{bmatrix} V_Q^H \\ V_K^H \end{bmatrix} + C\begin{bmatrix} U_Q \\ U_K \end{bmatrix}\begin{bmatrix} V_Q^C \\ V_K^C \end{bmatrix}\right),$$

where $\lambda_Q$ represents the query vector scalar, $\lambda_K$ represents the key vector scalar, σ(□) represents a logical sigmoid nonlinear change, and is used for mapping the scalar to a value between 0 and 1. C represents the context vector, $U_Q$ represents a fourth parameter matrix, $U_K$ represents a fifth parameter matrix, the fourth parameter matrix and the fifth parameter matrix are pre-trained parameter matrices, $V_Q^H$ represents a first linear transformation factor, $V_K^H$ represents a second linear transformation factor, $V_Q^C$ represents a third linear transformation factor, and $V_K^C$ represents a fourth linear transformation factor.

The fourth parameter matrix $U_Q$ and the fifth parameter matrix $U_K$ are trainable parameter matrices of $d_c \times d$. The first linear transformation factor $V_Q^H$ and the second linear transformation factor $V_K^H$ are linear transformation factors of d×1, and are used for linearly mapping the d-dimensional vector to a scalar. The third linear transformation factor $V_Q^C$ and the fourth linear transformation factor $V_K^C$ are linear transformation factors of d×1, and are used for linearly mapping each vector (d-dimensional) in Q to a scalar (1-dimensional).

Finally, the target query vector and the target key vector are calculated in the following manner:

$$\begin{bmatrix} \hat{Q} \\ \hat{K} \end{bmatrix} = \left(1 - \begin{bmatrix} \lambda_Q \\ \lambda_K \end{bmatrix}\right)\begin{bmatrix} Q \\ K \end{bmatrix} + \begin{bmatrix} \lambda_Q \\ \lambda_K \end{bmatrix}\left(C\begin{bmatrix} U_Q \\ U_K \end{bmatrix}\right),$$

where $\hat{Q}$ represents the target query vector, and $\hat{K}$ represents the target key vector. Therefore, the target query vector and the target key vector with the context vector are obtained. The weighted sum of the original query vector and the context vector is calculated, the weight is a scalar $\lambda_Q$, the weighted sum of the original key vector and the context vector is calculated, and the weight is a scalar $\lambda_K$. The weighted sums are used at the same time to dynamically adjust the proportions of the context representation participating in a final target query vector and a final target key vector.

Next, in this embodiment of this disclosure, a specific calculation manner is provided. The original query vector, the original key vector, and the original value vector may be calculated according to the target text sequence. The query vector scalar and the key vector scalar are calculated according to the context vector, the original query vector, and the original key vector. The target query vector and the target key vector are calculated according to the context vector, the query vector scalar, and the key vector scalar. In the foregoing manner, a specific operation manner is provided for implementing the solution, and the calculation of the formula is used to clarify how to obtain the parameters, thereby ensuring the feasibility and operability of the solution.

In this embodiment, after the target query vector and the target key vector with the context vector are obtained, the logical similarity may be calculated by using the following formula, that is, $$e = \frac{\hat{Q} \cdot \hat{K}^T}{\sqrt{d}},$$

where e represents the logical similarity, $\hat{Q}$ represents the target query vector, $\hat{K}$ represents the target key vector, $\hat{K}^T$ represents the transpose of the target key vector, and d represents the dimension of the hidden state vector of the model. e herein represents a matrix, where $e_{ij}$ represents a logical similarity between an $i^{th}$ element of the target query vector $\hat{Q}$ and a $j^{th}$ element of the target key vector $\hat{K}$.

Next, in this embodiment of this disclosure, a manner of calculating the logical similarity corresponding to the target text sequence according to the target query vector and the target key vector is provided. In the foregoing manner, a specific operation manner is provided for implementing the solution, and the calculation of the formula is used to clarify how to obtain the parameters, thereby ensuring the feasibility and operability of the solution.

Based on the embodiment corresponding to FIG. 7, in an exemplary embodiment of the information processing method provided in this embodiment of this disclosure, the encoding the target text sequence corresponding to the target text information by using the logical similarity to obtain a text encoding result may include:

determining a weight value corresponding to the target text sequence according to the logical similarity, the weight value being used for representing a relationship between elements in the target text sequence;

determining a target output vector according to the weight value corresponding to the target text sequence; and encoding the target text sequence corresponding to target text information by using the target output vector to obtain the text encoding result.

In this embodiment, after the logical similarity is obtained, the target text sequence corresponding to the target text information may be encoded by using the logical similarity to obtain the text encoding result. Specifically, the weight value corresponding to the target text sequence is first determined according to the logical similarity. The weight value is used for representing a relationship between elements in the target text sequence. That is, the weight value α of each key-value pair may be calculated by using the following formula:

α=softmax(e), according to the obtained weight value α, since an output vector of a current element is obtained by the weighted summation of all values, during actual calculation, the dot product of the weight and the value needs to be calculated, that is,

O=α·V, where O represents the target output vector, and V represents the original value vector. An output vector needs to be calculated for each layer of network until the network representation of each element is encoded.

Next, in this embodiment of this disclosure, how to encode the target text sequence corresponding to the target text information by using the logical similarity to obtain a text encoding result is described. First, the weight value corresponding to the target text sequence is determined according to the logical similarity. The target output vector is then determined according to the weight value corresponding to the target text sequence, and the target text sequence corresponding to the target text information is finally encoded by using the target output vector to obtain the text encoding result. In the foregoing manner, in the process of encoding text information, the output vector containing the context vector is used to strengthen the local information of the discrete sequence. This implementation improves the quality of model learning and implements better application to different products.

Based on the embodiment corresponding to FIG. 7, in an exemplary embodiment of the information processing method provided in this embodiment of this disclosure, after the obtaining a target text sequence corresponding to to-be-processed text information, the method may further include dividing the target text sequence into X text subsequences, X being an integer greater than 1. The step of determining a target query vector and a target key vector according to the context vector and the target text sequence may include generating X query vectors and X key vectors according to the context vector and the X text subsequences, each text subsequence corresponding to one query vector and one key vector. The step of determining the logical similarity according to the target query vector and the target key vector may include calculating the each text subsequence and a query vector and a key vector that correspond to the each text subsequence, to obtain X sub-logical similarities. The step of encoding the target text sequence by using the logical similarity to obtain a text encoding result may include: determining a sub-weight value corresponding to the each text subsequence according to each sub-logical similarity, the sub-weight value being used for representing a relationship between elements in the text subsequence; determining a sub-output vector according to the sub-weight value corresponding to the each text subsequence; generating a target output vector according to the sub-output vector corresponding to the each text subsequence; and encoding the target text sequence by using the target output vector to obtain the text encoding result.

Figure 11:
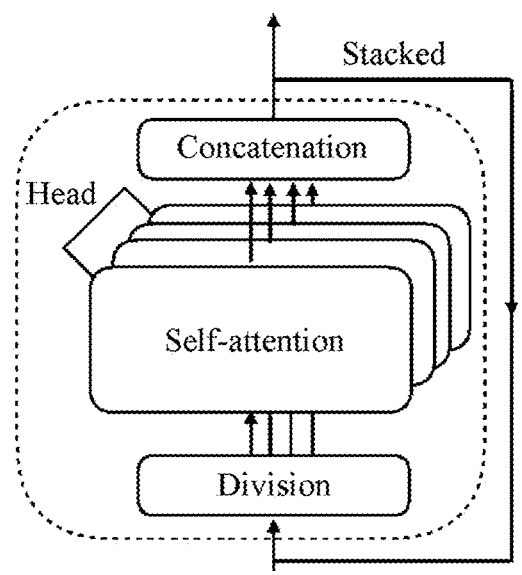
FIG. 11 is a schematic structural diagram of a stacked multi-head self-attention network according to an embodiment of this disclosure.

In this embodiment, a method for encoding a target text sequence by using a stacked multi-head self-attention network is described. For ease of understanding, FIG. 11 is a schematic structural diagram of a stacked multi-head self-attention network in this embodiment of this disclosure. First, the target text sequence is divided into X text subsequences (that is, X heads are obtained). Assuming that X is 4, the entire target text sequence is divided into 4 text subsequences. A corresponding query vector and key vector are then generated for each text subsequence. For the text subsequence corresponding to each head, different parameter matrices are used to calculate the query vector and the key vector to obtain different eigenvectors, so that different heads may focus on different local information. Finally, the outputted vector features of the heads are integrated through linear transformation and transferred to the next layer.

Next, the each text subsequence and a query vector and a key vector that correspond to the each text subsequence are sequentially calculated to obtain X sub-logical similarities. A sub-weight value corresponding to the each text subsequence is then determined according to each sub-logical similarity. A sub-output vector is determined according to the sub-weight value corresponding to the each text subsequence, and a target output vector is generated according to the sub-output vector corresponding to the each text subsequence. The target text sequence corresponding to the target text information is encoded by using the target output vector. The process is repeated many times until the encoding is completed for the network representation and the text encoding result is obtained.

In the stacked multi-head self-attention network, the query (Q), key (K), and value (V) first undergo a linear transformation, and are then inputted into the scaled dot product. This process needs to be performed $\beta$ times. That is, for the "multi-head," calculation is performed once for one head. Moreover, the parameter matrix for linear transformation of Q, K, and V is different each time. The results of the $\beta$ times of scaling dot products are concatenated, and a value obtained after a linear transformation is performed once is then used as the result of multi-head attention. The benefit of this is that the model is allowed to learn relevant information in different representation subspaces and that the information is verified later based on the attention visualization.

Multi-head attention is used to connect the encoder to the decoder. K, V, and Q are the layer outputs of the encoder (K=V herein) and the input of the multi-head attention in the decoder. Decoder and encoder attention is used to perform translation alignment. Multi-head self-attention is used in both the encoder and the decoder to learn the representation of the text. Self-attention is K=V=Q. For example, if one sentence is inputted, attention calculation needs to be performed on every word in the sentence and all words in the sentence. The purpose is to learn the word dependence within the sentence and capture the internal structure of the sentence.

Next, in this embodiment of this disclosure, a method using a multi-head attention mechanism is proposed to implement encoding. That is, a target text sequence is first divided into X text subsequences, X being an integer greater than 1. X query vectors and X key vectors are then generated according to the context vector and the X text subsequences. Each text subsequence and a query vector and a key vector that correspond to the each text subsequence are calculated to obtain X sub-logical similarities. Finally, a sub-weight value corresponding to the each text subsequence is determined according to each sub-logical similarity. A sub-output vector is determined according to the sub-weight value corresponding to the each text subsequence, and a target output vector is generated according to the sub-output vector corresponding to the each text subsequence. The target text sequence corresponding to the target text information is encoded by using the target output vector to obtain a text encoding result. In the foregoing manner, the entire network uses residual connections and normalizes the layers, so that the deep network can be better optimized, and the training speed is faster than that of the mainstream model.

Figure 12:
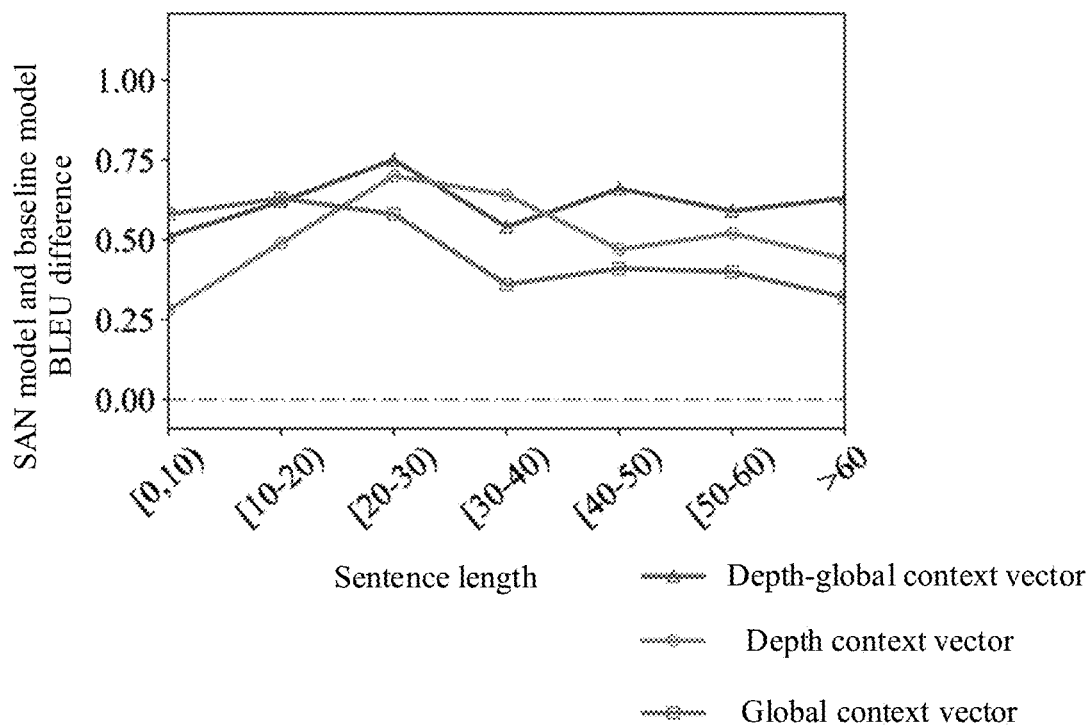
FIG. 12 is a schematic diagram of a comparison of translation using a SAN model in an application scenario according to this disclosure.

For ease of description, machine translation is used as an example. Long sentences used for testing are divided into 10 groups, and the length of the sentences and the long sentence bilingual evaluation understudy (BLEU) scores are evaluated. FIG. 12 is a schematic diagram of a comparison of translation using a SAN model in an application scenario of this disclosure. As shown in the figure, the abscissa in FIG. 12 represents the sentence length, and the ordinate represents the BLEU difference between the SAN model enhanced by a context vector and a baseline model. It can be seen that the translation quality of the SAN model enhanced by the context vector is significantly better than the relevant model on different sentence lengths. Complicated syntax and deep semantics are involved in longer sentences (such as sentences with more than 20 words), so it is more necessary to depend on element relationships.

Table 1 shows the effect of the network model provided in this disclosure on a machine translation system.

TABLE 1

| Model | | Translation effect | | Computing resources | |
| --- | --- | --- | --- | --- | --- |
| | | BLEU | Δ | Quantity of parameters | Training speed |
| Baseline | Relevant model | 27.64 | — | 88.0M | 1.28 |
| Embodiments of this disclosure | Global | 28.26 | +0.62 | 91.0M | 1.26 |
| | Depth | 28.31 | +0.67 | 95.9M | 1.18 |
| | Depth-global | 28.45 | +0.81 | 99.0M | 1.25 |

Generally, when the BLEU score increases by more than 0.5 points, a significant increase is indicated. Δ is the absolute value of the increase. The unit of the quantity of parameters is million (M), and the unit of training speed is the quantity of iterations per second. Therefore, as shown in Table 1, the methods proposed in this disclosure significantly improves the translation quality. In particular, the proposed methods have better performance in the translation of longer sentences.

Figure 13:
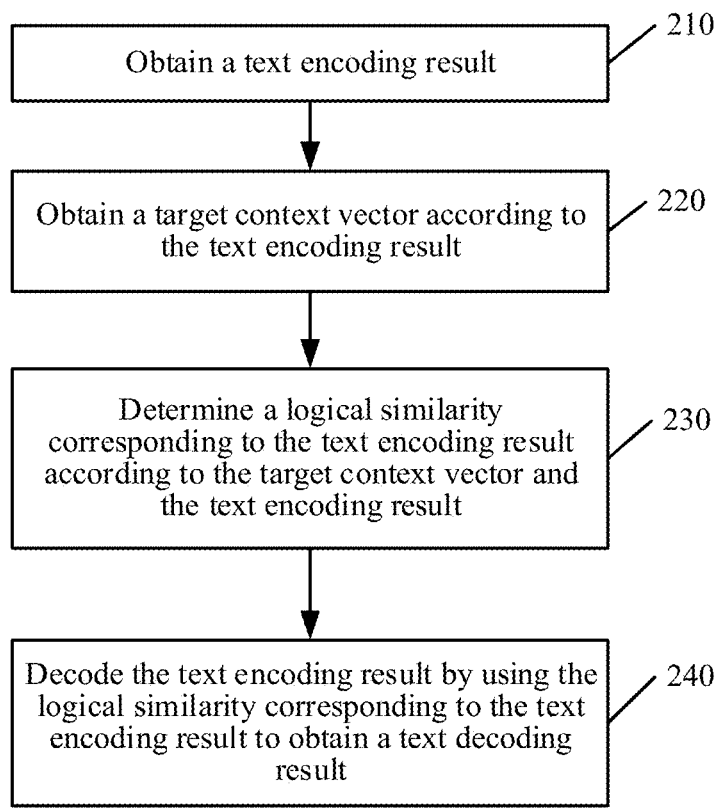
FIG. 13 is a schematic diagram of another embodiment of an information processing method according to an embodiment of this disclosure.

As shown in FIG. 13, an embodiment of this disclosure further provides another information processing method, applied to a computer device. The method includes the following steps:

Step 210: Obtain a text encoding result.

Step 220: Obtain a target context vector according to the text encoding result.

Step 230: Determine a logical similarity corresponding to the text encoding result according to the target context vector and the text encoding result.

Step 240: Decode the text encoding result by using the logical similarity corresponding to the text encoding result to obtain a text decoding result.

For descriptions of step 220 to step 240, reference may be made to the embodiment in FIG. 7, and details are not described herein again.

In summary, in the technical solution provided in this embodiment of this disclosure, a text encoding result is obtained, a target context vector is obtained according to the text encoding result, a logical similarity corresponding to the text encoding result is determined according to the target context vector and the text encoding result, and the text encoding result is decoded by using the logical similarity corresponding to the text encoding result to obtain a text decoding result. In the foregoing manner, the dependence between elements in a text encoding result is strengthened, and network representations between different words can be flexibly learned by using context information. Thereby, this implementation enhances the performance of a neural network model and improves the learning capability of the model.

In an embodiment, the obtaining a context vector according to the text encoding result includes:

obtaining a vector of each element in the text encoding result; and calculating an average value of the text encoding result according to the vector of the each element in the text encoding result, the average value being used for representing the context vector.

In an embodiment, the obtaining a context vector according to the text encoding result includes:

obtaining L layers of text sequences generated before the text encoding result, L being an integer greater than or equal to 1; and generating the context vector according to the L layers of text sequences.

In an embodiment, the obtaining a context vector according to the text encoding result includes:

obtaining L layers of text sequences corresponding to the text encoding result, the L layers of text sequences being network layers generated before the text encoding result, L being an integer greater than or equal to 1;

obtaining L layers of first context vectors according to the L layers of text sequences, each layer of first context vector being an average value of elements in each layer of text sequence;

obtaining a second context vector according to the text encoding result, the second context vector being an average value of elements in the text encoding result; and calculating the context vector according to the L layers of first context vectors and the second context vector.

In an embodiment, the determining a logical similarity corresponding to the text encoding result according to the context vector and the text encoding result includes:

determining a target query vector and a target key vector according to the context vector and the text encoding result, the target query vector corresponding to the text encoding result, the target key vector corresponding to the text encoding result; and determining the logical similarity according to the target query vector and the target key vector.

In an embodiment, determining a target query vector and a target key vector according to the context vector and the text encoding result includes:

calculating an original query vector, an original key vector, and an original value vector according to the text encoding result;

calculating a query vector scalar and a key vector scalar according to the context vector, the original query vector, and the original key vector; and calculating the target query vector and the target key vector according to the context vector, the query vector scalar, and the key vector scalar.

In an embodiment, calculating an original query vector, an original key vector, and an original value vector according to the text encoding result includes:

calculating the original query vector, the original key vector, and the original value vector in the following manner:

$$\begin{bmatrix} Q \\ K \\ V \end{bmatrix} = H \begin{bmatrix} W_Q \\ W_K \\ W_V \end{bmatrix},$$

where Q represents the original query vector, K represents the original key vector, V represents the original value vector, H represents the text encoding result, $W_Q$ represents a first parameter matrix, $W_K$ represents a second parameter matrix, $W_V$ represents a third parameter matrix, and the first parameter matrix, the second parameter matrix, and the third parameter matrix are pre-trained parameter matrices; and the calculating a query vector scalar and a key vector scalar according to the context vector, the original query vector, and the original key vector includes:

calculating the query vector scalar and the key vector scalar in the following manner:

$$\begin{bmatrix} \lambda_Q \\ \lambda_K \end{bmatrix} = \sigma\left(\begin{bmatrix} Q \\ K \end{bmatrix}\begin{bmatrix} V_Q^H \\ V_K^H \end{bmatrix} + C \begin{bmatrix} U_Q \\ U_K \end{bmatrix}\begin{bmatrix} V_Q^C \\ V_K^C \end{bmatrix}\right),$$

where $\lambda_Q$ represents the query vector scalar, $\lambda_K$ represents the key vector scalar, $\sigma(\square)$ represents a sigmoid nonlinear change, C represents the context vector, $U_Q$ represents a fourth parameter matrix, $U_K$ represents a fifth parameter matrix, the fourth parameter matrix and the fifth parameter matrix are pre-trained parameter matrices, $V_Q^H$ represents a first linear transformation factor, $V_K^H$ represents a second linear transformation factor, $V_Q^C$ represents a third linear transformation factor, and $V_K^C$ represents a fourth linear transformation factor; and the calculating the target query vector and the target key vector according to the context vector, the query vector scalar, and the key vector scalar includes:

calculating the target query vector and the target key vector in the following manner:

$$\begin{bmatrix} \hat{Q} \\ \hat{K} \end{bmatrix} = \left(1 - \begin{bmatrix} \lambda_Q \\ \lambda_K \end{bmatrix}\right)\begin{bmatrix} Q \\ K \end{bmatrix} + \begin{bmatrix} \lambda_Q \\ \lambda_K \end{bmatrix}\left(C\begin{bmatrix} U_Q \\ U_K \end{bmatrix}\right),$$

where $\hat{Q}$ represents the target query vector, and $\hat{K}$ represents the target key vector.

In an embodiment, determining the logical similarity corresponding to the text encoding result according to the target query vector and the target key vector includes:

calculating the logical similarity in the following manner:

$$e = \frac{\hat{Q} \cdot \hat{K}^T}{\sqrt{d}},$$

where e represents the logical similarity, $\hat{Q}$ represents the target query vector, $\hat{K}$ represents the target key vector, $\hat{K}^T$ represents the transpose of the target key vector, and d represents the dimension of the hidden state vector of the model.

In an embodiment, decoding the text encoding result by using the logical similarity to obtain a text decoding result includes:

determining a weight value corresponding to the text encoding result according to the logical similarity, the weight value being used for representing a relationship between elements in the text encoding result;

determining a target output vector according to the weight value corresponding to the text encoding result; and encoding the text encoding result by using the target output vector to obtain the text encoding result.

In an embodiment, after obtaining the text encoding result corresponding to the to-be-processed text information, the method further includes:

dividing the text encoding result into X text subsequences, X being an integer greater than 1;

the determining a target query vector and a target key vector according to the context vector and the text encoding result includes:

generating X query vectors and X key vectors according to the context vector and the X text subsequences, each text subsequence corresponding to one query vector and one key vector;

the determining the logical similarity corresponding to the text encoding result according to the target query vector and the target key vector includes:

calculating the each text subsequence and a query vector and a key vector that correspond to the each text subsequence, to obtain X sub-logical similarities; and the decoding the text encoding result by using the logical similarity to obtain a text decoding result includes:

determining a sub-weight value corresponding to the each text subsequence according to each sub-logical similarity, the sub-weight value being used for representing a relationship between elements in the text subsequence;

determining a sub-output vector according to the sub-weight value corresponding to the each text subsequence;

generating a target output vector according to the sub-output vector corresponding to the each text subsequence; and decoding the text encoding result by using the target output vector to obtain the text decoding result.

For the foregoing descriptions, reference may be made to the embodiment in FIG. 7, and details are not described herein again.

Figure 14:
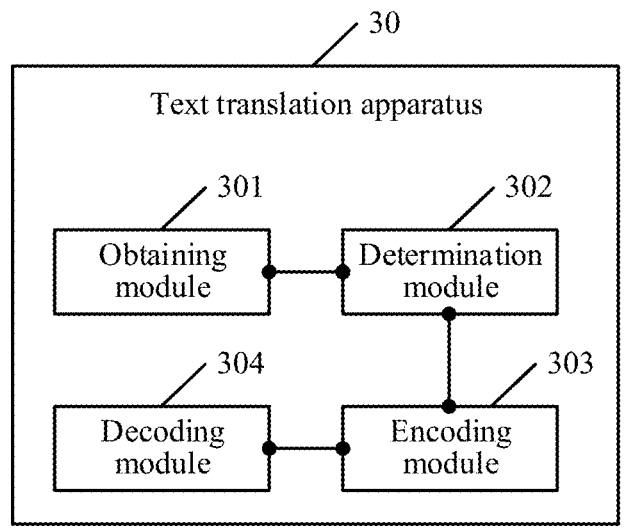
FIG. 14 is a schematic diagram of an embodiment of a text translation apparatus according to an embodiment of this disclosure.

A text translation apparatus in this disclosure is described below in detail. FIG. 14 is a schematic diagram of an embodiment of a text translation apparatus according to an embodiment of this disclosure. The apparatus has the function of implementing the foregoing method embodiment, and the function may be implemented by hardware or may be implemented by hardware executing corresponding software. In an embodiment, the text translation apparatus 30 includes:

an obtaining module 301, configured to obtain a target text sequence corresponding to target text information, the target text sequence including a plurality of elements;

the obtaining module 301 being further configured to obtain a context vector according to the target text sequence;

a determination module 302, configured to determine a target query vector and a target key vector according to the context vector and the target text sequence that are obtained by the obtaining module 301, the target query vector having a correspondence with elements in the target text sequence, the target key vector having a correspondence with elements in the target text sequence;

the determination module 302 being further configured to determine a logical similarity corresponding to the target text sequence according to the target query vector and the target key vector;

an encoding module 303, configured to encode the target text sequence corresponding to the target text information by using the logical similarity determined by the determination module 302 to obtain a text encoding result; and a decoding module 304, configured to decode the text encoding result encoded by the encoding module 303 to obtain a text translation result corresponding to the target text information.

In this embodiment, the obtaining module 301 obtains a target text sequence corresponding to target text information, the target text sequence including a plurality of elements; the obtaining module 301 obtains a context vector according to the target text sequence; the determination module 302 determines a target query vector and a target key vector according to the context vector and the target text sequence that are obtained by the obtaining module 301, the target query vector having a correspondence with elements in the target text sequence, the target key vector having a correspondence with elements in the target text sequence; and the determination module 302 determines a logical similarity corresponding to the target text sequence according to the target query vector and the target key vector, the encoding module 303 encodes the target text sequence corresponding to the target text information by using the logical similarity determined by the determination module 302 to obtain a text encoding result, and the decoding module 304 decodes the text encoding result encoded by the encoding module 303 to obtain a text translation result corresponding to the target text information.

In this embodiment of this disclosure, the text translation apparatus is provided. First, a target text sequence corresponding to target text information is obtained, the target text sequence including a plurality of elements; a context vector is obtained according to the target text sequence; a target query vector and a target key vector are determined according to the context vector and the target text sequence, the target query vector having a correspondence with elements in the target text sequence, the target key vector having a correspondence with elements in the target text sequence; and a logical similarity corresponding to the target text sequence is determined according to the target query vector and the target key vector, the target text sequence corresponding to the target text information is encoded by using the logical similarity to obtain a text encoding result, and the text encoding result is decoded to obtain a text translation result corresponding to the target text information. In the foregoing manner, a context vector related to a discrete sequence is used to encode the discrete sequence, to strengthen the dependence between elements in the discrete sequence, so that a network representation between different words can be flexibly learned by using context information, thereby improving the quality of machine translation.

Figure 15:
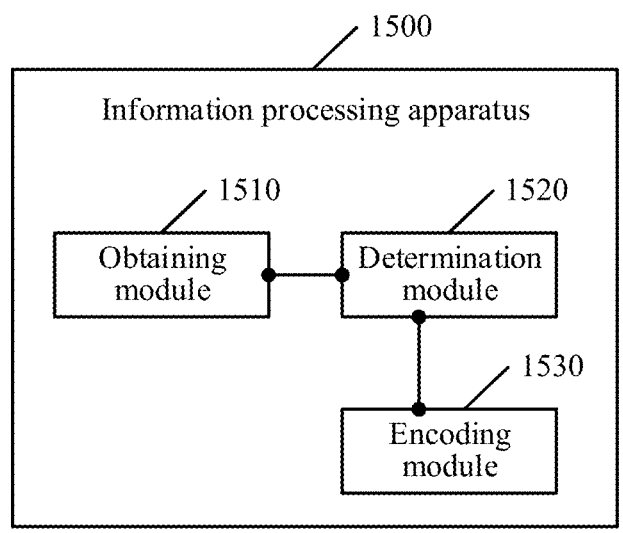
FIG. 15 is a schematic diagram of an embodiment of an information processing apparatus according to an embodiment of this disclosure.

An information processing apparatus in this disclosure is described below in detail. The information processing apparatus has the function of implementing the foregoing method embodiment, and the function may be implemented by hardware or may be implemented by hardware executing corresponding software. The apparatus may be a computer device or may be disposed in a computer device. In an embodiment, as shown in FIG. 15, an information processing apparatus 1500 includes:

an obtaining module 1510, configured to obtain a target text sequence corresponding to to-be-processed text information;

the obtaining module 1510 being further configured to obtain a context vector according to the target text sequence;

a determination module 1520, configured to determine a logical similarity corresponding to the target text sequence according to the context vector and the target text sequence that are obtained by the obtaining module; and an encoding module 1530, configured to encode the target text sequence by using the logical similarity determined by the determination module to obtain a text encoding result.

In summary, in the technical solution provided in this embodiment of this disclosure, a target text sequence corresponding to to-be-processed text information is obtained; a context vector is obtained according to the target text sequence; a logical similarity corresponding to the target text sequence is determined according to the context vector and the target text sequence; and the target text sequence is encoded by using the logical similarity to obtain a text encoding result. In the foregoing manner, a context vector related to a discrete sequence is used to encode the discrete sequence, to strengthen the dependence between elements in the discrete sequence, thereby enhancing the performance of a neural network model and improving the learning capability of the model.

In an exemplary embodiment, the obtaining module 1510 is configured to:
obtain a vector of each element in the target text sequence; and
calculate an average value of the target text sequence according to the vector of the each element in the target text sequence, the average value being used for representing the context vector.

In an exemplary embodiment, the obtaining module 1510 is configured to:
obtain L layers of text sequences generated before the target text sequence, L being an integer greater than or equal to 1; and
generate the context vector according to the L layers of text sequences.

In an exemplary embodiment, the obtaining module 1510 is configured to:
obtain L layers of text sequences corresponding to the target text sequence, the L layers of text sequences being network layers generated before the target text sequence, L being an integer greater than or equal to 1;
obtain L layers of first context vectors according to the L layers of text sequences, each layer of first context vector being an average value of elements in each layer of text sequence;
obtain a second context vector according to the target text sequence, the second context vector being an average value of elements in the target text sequence; and
calculate the context vector according to the L layers of first context vectors and the second context vector.

In an exemplary embodiment, the determination module 1520 is configured to:
determine a target query vector and a target key vector according to the context vector and the target text sequence, the target query vector corresponding to the target text sequence, the target key vector corresponding to the target text sequence; and
determine the logical similarity according to the target query vector and the target key vector.

In an exemplary embodiment, the determination module 1520 is configured to:
calculate an original query vector, an original key vector, and an original value vector according to the target text sequence;
calculate a query vector scalar and a key vector scalar according to the context vector, the original query vector, and the original key vector; and
calculate the target query vector and the target key vector according to the context vector, the query vector scalar, and the key vector scalar.

In an exemplary embodiment, the determination module 1520 is configured to:
calculate the original query vector, the original key vector, and the original value vector in the following manner:

$$\begin{bmatrix} Q \\ K \\ V \end{bmatrix} = H \begin{bmatrix} W_Q \\ W_K \\ W_V \end{bmatrix},$$

where Q represents the original query vector, K represents the original key vector, V represents the original value vector, H represents the target text sequence, $W_Q$ represents a first parameter matrix, $W_K$ represents a second parameter matrix, $W_V$ represents a third parameter matrix, and the first parameter matrix, the second parameter matrix, and the third parameter matrix are pre-trained parameter matrices;

the determination module 1520 is configured to:
calculate the query vector scalar and the key vector scalar in the following manner:

$$\begin{bmatrix} \lambda_Q \\ \lambda_K \end{bmatrix} = \sigma\left( \begin{bmatrix} Q \\ K \end{bmatrix} \begin{bmatrix} V_Q^H \\ V_K^H \end{bmatrix} + C \begin{bmatrix} U_Q \\ U_K \end{bmatrix} \begin{bmatrix} V_Q^C \\ V_K^C \end{bmatrix} \right),$$

where $\lambda_Q$ represents the query vector scalar, $\lambda_K$ represents the key vector scalar, $\sigma(\square)$ represents a sigmoid nonlinear change, C represents the context vector, $U_Q$ represents a fourth parameter matrix, $U_K$ represents a fifth parameter matrix, the fourth parameter matrix and the fifth parameter matrix are pre-trained parameter matrices, $V_Q^H$ represents a first linear transformation factor, $V_K^H$ represents a second linear transformation factor, $V_Q^C$ represents a third linear transformation factor, and $V_K^C$ represents a fourth linear transformation factor; and the determination module 1520 is configured to:
calculate the target query vector and the target key vector in the following manner:

$$\begin{bmatrix} \hat{Q} \\ \hat{K} \end{bmatrix} = \left(1 - \begin{bmatrix} \lambda_Q \\ \lambda_K \end{bmatrix}\right) \begin{bmatrix} Q \\ K \end{bmatrix} + \begin{bmatrix} \lambda_Q \\ \lambda_K \end{bmatrix} \left( C \begin{bmatrix} U_Q \\ U_K \end{bmatrix} \right),$$

where $\hat{Q}$ represents the target query vector, and $\hat{K}$ represents the target key vector.

In an exemplary embodiment, the determination module 1520 is configured to:
calculate the logical similarity in the following manner:

$$e = \frac{\hat{Q} \cdot \hat{K}^T}{\sqrt{d}},$$

where e represents the logical similarity, $\hat{Q}$ represents the target query vector, $\hat{K}$ represents the target key vector, $\hat{K}^T$ represents the transpose of the target key vector, and d represents the dimension of the hidden state vector of the model.

The encoding module 1530 is configured to:
  determine a weight value corresponding to the target text sequence according to the logical similarity, the weight value being used for representing a relationship between elements in the target text sequence;
  determine a target output vector according to the weight value corresponding to the target text sequence; and
  encode the target text sequence by using the target output vector to obtain the text encoding result.

In an exemplary embodiment, the apparatus 1500 further includes:
  a division module (not shown in the figure), configured to divide the target text sequence into X text subsequences, X being an integer greater than 1;
  the determination module 1520 is configured to:
  generate X query vectors and X key vectors according to the context vector and the X text subsequences, each text subsequence corresponding to one query vector and one key vector;
  the determining the logical similarity according to the target query vector and the target key vector includes:
  calculating the each text subsequence and a query vector and a key vector that correspond to the each text subsequence, to obtain X sub-logical similarities;
  the encoding module 1530 is configured to:
  determine a sub-weight value corresponding to the each text subsequence according to each sub-logical similarity, the sub-weight value being used for representing a relationship between elements in the text subsequence;
  determine a sub-output vector according to the sub-weight value corresponding to the each text subsequence;
  generate a target output vector according to the sub-output vector corresponding to the each text subsequence; and
  encode the target text sequence by using the target output vector to obtain the text encoding result.

Figure 16:
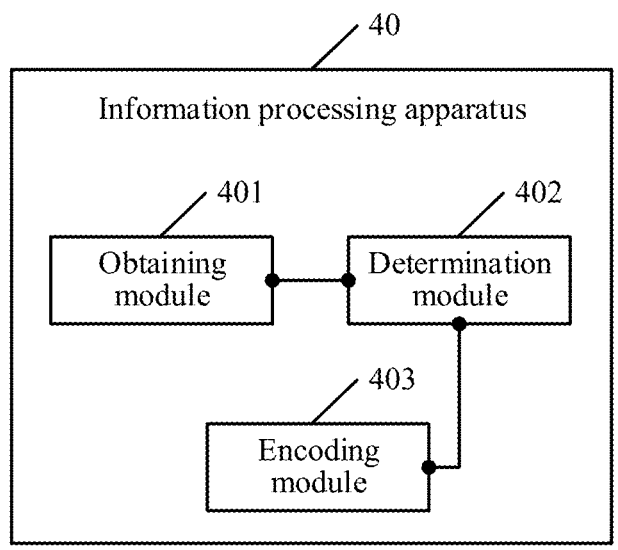
FIG. 16 is a schematic diagram of another embodiment of an information processing apparatus according to an embodiment of this disclosure.

The information processing apparatus in this disclosure is described below in detail. FIG. 16 is a schematic diagram of another embodiment of an information processing apparatus according to an embodiment of this disclosure. The apparatus has the function of implementing the foregoing method embodiment, and the function may be implemented by hardware or may be implemented by hardware executing corresponding software. The apparatus may be a computer device or may be disposed in a computer device. In an embodiment, an information processing apparatus 40 includes:
  an obtaining module 401, configured to acquire a target text sequence corresponding to to-be-processed text information, the target text sequence including a plurality of elements;
  the obtaining module 401 being configured to obtain a context vector according to the target text sequence;
  a determination module 402, configured to determine a target query vector and a target key vector according to the context vector and the target text sequence that are obtained by the obtaining module 401, the target query vector having a correspondence with elements in the target text sequence, the target key vector having a correspondence with elements in the target text sequence;
  the determination module 402 being further configured to determine a logical similarity corresponding to the target text sequence according to the target query vector and the target key vector; and
  an encoding module 403, configured to encode the target text sequence corresponding to target text information by using the logical similarity determined by the determination module 402 to obtain a text encoding result.

In this embodiment, the obtaining module 401 obtains a target text sequence corresponding to to-be-processed text information, the target text sequence including a plurality of elements; the obtaining module 401 obtains a context vector according to the target text sequence; the determination module 402 determines a target query vector and a target key vector according to the context vector and the target text sequence that are obtained by the obtaining module 401, the target query vector having a correspondence with elements in the target text sequence, the target key vector having a correspondence with elements in the target text sequence, and the determination module 402 determines a logical similarity corresponding to the target text sequence according to the target query vector and the target key vector; and the encoding module 403 encodes the target text sequence corresponding to the target text information by using the logical similarity determined by the determination module 402 to obtain a text encoding result.

In this embodiment of this disclosure, the information processing apparatus is provided. First, a target text sequence corresponding to to-be-processed text information is obtained, the target text sequence including a plurality of elements; a context vector is then obtained according to the target text sequence; a target query vector and a target key vector are then determined according to the context vector and the target text sequence, the target query vector having a correspondence with elements in the target text sequence, the target key vector having a correspondence with elements in the target text sequence; and finally, a logical similarity corresponding to the target text sequence is determined according to the target query vector and the target key vector, and the target text sequence corresponding to target text information is encoded by using the logical similarity to obtain a text encoding result. In the foregoing manner, a context vector related to a discrete sequence is used to encode the discrete sequence, to strengthen the dependence between elements in the discrete sequence, thereby enhancing the performance of a neural network model and improving the learning capability of the model.

Based on the embodiment corresponding to FIG. 16, in another embodiment of the information processing apparatus 40 provided in this embodiment of this disclosure,
  the obtaining module 401 is specifically configured to:
    obtain a vector of each element in the target text sequence; and
    calculate an average value of the target text sequence according to the vector of the each element in the target text sequence, the average value being used for representing the context vector.

Second, in this embodiment of this disclosure, a method for obtaining a context vector based on a global text sequence is provided. That is, a vector of each element in the target text sequence is obtained. An average value of the target text sequence is calculated according to the vector of each element in the target text sequence. The average value is represented as the context vector. In the foregoing manner, the context vector may be obtained through the entire text sequence, to provide a feasible manner of implementing the solution, thereby improving the operability of the solution.

Based on the embodiment corresponding to FIG. 16, in another embodiment of the information processing apparatus 40 provided in this embodiment of this disclosure,
  the obtaining module 401 is specifically configured to:
    obtain L layers of text sequences corresponding to the target text sequence, the L layers of text sequences being network layers generated before the target text sequence, L being an integer greater than or equal to 1; and generate the context vector according to the L layers of text sequences.

Second, in this embodiment of this disclosure, a method for obtaining a context vector based on a depth text sequence is provided. That is, L layers of text sequences corresponding to the target text sequence are first obtained, the L layers of text sequences being network layers generated before the target text sequence, L being an integer greater than or equal to 1; and the context vector is then generated according to the L layers of text sequences. In the foregoing manner, the context vector may be obtained by using the plurality of depth text sequences, to provide a feasible manner of implementing the solution, thereby improving the operability of the solution.

Based on the embodiment corresponding to FIG. 16, in another embodiment of the information processing apparatus 40 provided in this embodiment of this disclosure, the obtaining module 401 is specifically configured to:
obtain L layers of text sequences corresponding to the target text sequence, the L layers of text sequences being network layers generated before the target text sequence, L being an integer greater than or equal to 1;
obtain L layers of first context vectors according to the L layers of text sequences, each layer of first context vector being an average value of elements in each layer of text sequence;
obtain a second context vector according to the target text sequence, the second context vector being an average value of elements in the target text sequence; and
calculate the context vector according to the L layers of first context vectors and the second context vector.

Second, in this embodiment of this disclosure, a method for obtaining a context vector based on depth and global text sequences is provided. That is, L layers of first context vectors are first obtained according to the L layers of text sequences, each layer of first context vector being an average value of elements in each layer of text sequence. The second context vector is then obtained according to the target text sequence, the second context vector being an average value of elements in the target text sequence. Finally, the context vector is calculated according to the L layers of first context vectors and the second context vector. In the foregoing manner, the context vector may be obtained by using the plurality of depth-global text sequences, to provide a feasible manner of implementing the solution, thereby improving the operability of the solution.

Based on the embodiment corresponding to FIG. 16, in another embodiment of the information processing apparatus 40 provided in this embodiment of this disclosure, the determination module 402 is specifically configured to: calculate an original query vector, an original key vector, and an original value vector according to the target text sequence, the original value vector being used for determining a target output vector corresponding to the target text sequence;
calculate a query vector scalar and a key vector scalar according to the context vector, the original query vector, and the original key vector; and
calculate the target query vector and the target key vector according to the context vector, the query vector scalar, and the key vector scalar.

Next, in this embodiment of this disclosure, a manner of determining the target query vector and the target key vector according to the context vector and the target text sequence is described. That is, the original query vector, the original key vector, and the original value vector are first calculated according to the target text sequence. The query vector scalar and the key vector scalar are then calculated according to the context vector, the original query vector, and the original key vector. Finally, the target query vector and the target key vector are calculated according to the context vector, the query vector scalar, and the key vector scalar. In the foregoing manner, the context vector is incorporated into the target query vector and the target key vector, to enhance the feature representation of the original query vector and the original key vector, thereby strengthening the network representation of the entire text sequence and improving the model learning performance.

Based on the embodiment corresponding to FIG. 16, in another embodiment of the information processing apparatus 40 provided in this embodiment of this disclosure, the determination module 402 is specifically configured to:
calculate the original query vector, the original key vector, and the original value vector in the following manner:

$$\begin{bmatrix} Q \\ K \\ V \end{bmatrix} = H \begin{bmatrix} W_Q \\ W_K \\ W_V \end{bmatrix},$$

where Q represents the original query vector, K represents the original key vector, V represents the original value vector, H represents the target text sequence, $W_Q$ represents a first parameter matrix, $W_K$ represents a second parameter matrix, $W_V$ represents a third parameter matrix, and the first parameter matrix, the second parameter matrix, and the third parameter matrix are pre-trained parameter matrices;

calculate the query vector scalar and the key vector scalar in the following manner:

$$\begin{bmatrix} \lambda_Q \\ \lambda_K \end{bmatrix} = \sigma \left( \begin{bmatrix} Q \\ K \end{bmatrix} \begin{bmatrix} V_Q^H \\ V_K^H \end{bmatrix} + C \begin{bmatrix} U_Q \\ U_K \end{bmatrix} \begin{bmatrix} V_Q^C \\ V_K^C \end{bmatrix} \right),$$

where $\lambda_Q$ represents the query vector scalar, $\lambda_K$ represents the key vector scalar, $\sigma(\square)$ represents a sigmoid nonlinear change, C represents the context vector, $U_Q$ represents a fourth parameter matrix, $U_K$ represents a fifth parameter matrix, the fourth parameter matrix and the fifth parameter matrix are pre-trained parameter matrices, $V_Q^H$ represents a first linear transformation factor, $V_K^H$ represents a second linear transformation factor, $V_Q^C$ represents a third linear transformation factor, and $V_K^C$ represents a fourth linear transformation factor; and calculate the target query vector and the target key vector in the following manner:

$$\begin{bmatrix} \hat{Q} \\ \hat{K} \end{bmatrix} = \left(1 - \begin{bmatrix} \lambda_Q \\ \lambda_K \end{bmatrix}\right) \begin{bmatrix} Q \\ K \end{bmatrix} + \begin{bmatrix} \lambda_Q \\ \lambda_K \end{bmatrix} \left(C \begin{bmatrix} U_Q \\ U_K \end{bmatrix}\right),$$

where $\hat{Q}$ represents the target query vector, and $\hat{K}$ represents the target key vector.

Next, in this embodiment of this disclosure, a specific calculation manner is provided. The original query vector, the original key vector, and the original value vector may be calculated according to the target text sequence. The query vector scalar and the key vector scalar are calculated according to the context vector, the original query vector, and the original key vector. The target query vector and the target key vector are calculated according to the context vector, the query vector scalar, and the key vector scalar. In the foregoing manner, a specific operation manner is provided for implementing the solution, and the calculation of the formula is used to clarify how to obtain the parameters, thereby ensuring the feasibility and operability of the solution.

Based on the embodiment corresponding to FIG. 16, in another embodiment of the information processing apparatus 40 provided in this embodiment of this disclosure, the determination module 402 is specifically configured to calculate the logical similarity in the following manner:

$$e = \frac{\hat{Q} \cdot \hat{K}^T}{\sqrt{d}},$$

where e represents the logical similarity, $\hat{Q}$ represents the target query vector, $\hat{K}$ represents the target key vector, $\hat{K}^T$ represents the transpose of the target key vector, and d represents the dimension of the hidden state vector of the model.

Next, in this embodiment of this disclosure, a manner of calculating the logical similarity corresponding to the target text sequence according to the target query vector and the target key vector is provided. In the foregoing manner, a specific operation manner is provided for implementing the solution, and the calculation of the formula is used to clarify how to obtain the parameters, thereby ensuring the feasibility and operability of the solution.

Based on the embodiment corresponding to FIG. 16, in another embodiment of the information processing apparatus 40 provided in this embodiment of this disclosure, the encoding module 403 is specifically configured to:
determine a weight value corresponding to the target text sequence according to the logical similarity, the weight value being used for representing a relationship between elements in the target text sequence;
determine a target output vector according to the weight value corresponding to the target text sequence; and
encode the target text sequence corresponding to target text information by using the target output vector to obtain a text encoding result.

Next, in this embodiment of this disclosure, how to encode the target text sequence corresponding to the target text information by using the logical similarity to obtain a text encoding result is described. First, the weight value corresponding to the target text sequence is determined according to the logical similarity, the target output vector is then determined according to the weight value corresponding to the target text sequence, and the target text sequence corresponding to the target text information is finally encoded by using the target output vector to obtain the text encoding result. In the foregoing manner, in the process of encoding text information, the output vector containing the context vector is used to strengthen the local information of the discrete sequence, improve the quality of model learning, and implement better disclosure to different products.

Figure 17:
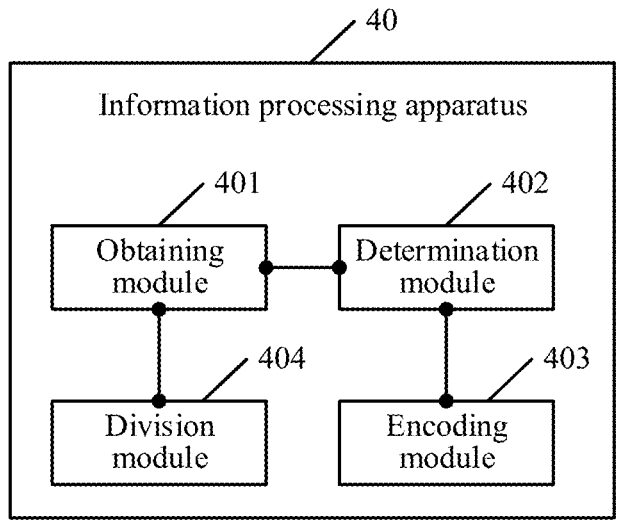
FIG. 17 is a schematic diagram of another embodiment of an information processing apparatus according to an embodiment of this disclosure.

Based on the embodiment corresponding to FIG. 16, referring to FIG. 17, in another embodiment of the information processing apparatus 40 provided in this embodiment of this disclosure, the information processing apparatus 40 further includes a division module 404;
the division module 404 is configured to: after the obtaining module 401 obtains a target text sequence corresponding to to-be-processed text information, divide the target text sequence into X text subsequences, X being an integer greater than 1;
the determination module 402 is specifically configured to: generate X query vectors and X key vectors according to the context vector and the X text subsequences, each text subsequence corresponding to one query vector and one key vector; and
calculate the each text subsequence and a query vector and a key vector that correspond to the each text subsequence, to obtain X sub-logical similarities; and
the encoding module 403 is specifically configured to: determine a sub-weight value corresponding to the each text subsequence according to each sub-logical similarity, the sub-weight value being used for representing a relationship between elements in the text sub sequence;
determine a sub-output vector according to the sub-weight value corresponding to the each text subsequence;
generate a target output vector according to the sub-output vector corresponding to the each text subsequence; and
encode the target text sequence corresponding to target text information by using the target output vector to obtain a text encoding result.

Next, in this embodiment of this disclosure, a method using a multi-head attention mechanism is proposed to implement encoding. That is, a target text sequence is first divided into X text subsequences, X being an integer greater than 1. X query vectors and X key vectors are then generated according to the context vector and the X text subsequences. Each text subsequence and a query vector and a key vector that correspond to the each text subsequence are calculated to obtain X sub-logical similarities. Finally, a sub-weight value corresponding to the each text subsequence is determined according to each sub-logical similarity. A sub-output vector is determined according to the sub-weight value corresponding to the each text subsequence, and a target output vector is generated according to the sub-output vector corresponding to the each text subsequence. The target text sequence corresponding to target text information is encoded by using the target output vector to obtain a text encoding result. In the foregoing manner, the entire network uses residual connections and normalizes the layers, so that the deep network can be better optimized, and the training speed is faster than that of the mainstream model.

Figure 18:
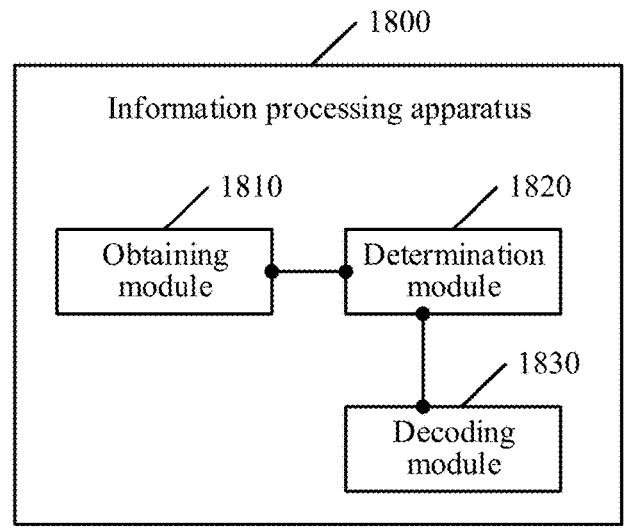
FIG. 18 is a schematic diagram of another embodiment of an information processing apparatus according to an embodiment of this disclosure.

An embodiment of this disclosure further provides an information processing apparatus. The information processing apparatus has the function of implementing the foregoing method embodiment, and the function may be implemented by hardware or may be implemented by hardware executing corresponding software. The apparatus may be a computer device or may be disposed in a computer device. In an embodiment, as shown in FIG. 18, an information processing apparatus 1800 includes:
an obtaining module 1810, configured to obtain a text encoding result;
the obtaining module 1810 being further configured to obtain a target context vector according to the text encoding result;

a determination module 1820, configured to determine a logical similarity corresponding to the text encoding result according to the target context vector and the text encoding result; and a decoding module 1830, configured to decode the text encoding result by using the logical similarity corresponding to the text encoding result to obtain a text decoding result.

In summary, in the technical solution provided in this embodiment of this disclosure, a text encoding result is obtained, a target context vector is obtained according to the text encoding result, a logical similarity corresponding to the text encoding result is determined according to the target context vector and the text encoding result, and the text encoding result is decoded by using the logical similarity corresponding to the text encoding result to obtain a text decoding result. In the foregoing manner, the dependence between elements in a text encoding result is strengthened, and network representations between different words can be flexibly learned by using context information, thereby enhancing the performance of a neural network model and improving the learning capability of the model.

In an exemplary embodiment, the obtaining module 1810 is configured to:
obtain a vector of each element in the text encoding result; and
calculate an average value of the text encoding result according to the vector of the each element in the text encoding result, the average value being used for representing the context vector.

In an exemplary embodiment, the obtaining module 1810 is configured to:
obtain L layers of text sequences generated before the text encoding result, L being an integer greater than or equal to 1; and
generate the context vector according to the L layers of text sequences.

In an exemplary embodiment, the obtaining module 1810 is configured to:
obtain L layers of text sequences corresponding to the text encoding result, the L layers of text sequences being network layers generated before the text encoding result, L being an integer greater than or equal to 1;
obtain L layers of first context vectors according to the L layers of text sequences, each layer of first context vector being an average value of elements in each layer of text sequence;
obtain a second context vector according to the text encoding result, the second context vector being an average value of elements in the text encoding result; and
calculate the context vector according to the L layers of first context vectors and the second context vector.

In an exemplary embodiment, the determination module 1820 is configured to:
determine a target query vector and a target key vector according to the context vector and the text encoding result, the target query vector corresponding to the text encoding result, the target key vector corresponding to the text encoding result; and
determine the logical similarity according to the target query vector and the target key vector.

In an exemplary embodiment, the determination module 1820 is configured to:
calculate an original query vector, an original key vector, and an original value vector according to the text encoding result;

calculate a query vector scalar and a key vector scalar according to the context vector, the original query vector, and the original key vector; and
calculate the target query vector and the target key vector according to the context vector, the query vector scalar, and the key vector scalar.

In an exemplary embodiment, the determination module 1820 is configured to:
calculate the original query vector, the original key vector, and the original value vector in the following manner:

$$\begin{bmatrix} Q \\ K \\ V \end{bmatrix} = H \begin{bmatrix} W_Q \\ W_K \\ W_V \end{bmatrix},$$

where Q represents the original query vector, K represents the original key vector, V represents the original value vector, H represents the text encoding result, $W_Q$ represents a first parameter matrix, $W_K$ represents a second parameter matrix, $W_V$ represents a third parameter matrix, and the first parameter matrix, the second parameter matrix, and the third parameter matrix are pre-trained parameter matrices; and the determination module 1820 is configured to:
calculate the query vector scalar and the key vector scalar in the following manner:

$$\begin{bmatrix} \lambda_Q \\ \lambda_K \end{bmatrix} = \sigma \left( \begin{bmatrix} Q \\ K \end{bmatrix} \begin{bmatrix} V_Q^H \\ V_K^H \end{bmatrix} + C \begin{bmatrix} U_Q \\ U_K \end{bmatrix} \begin{bmatrix} V_Q^C \\ V_K^C \end{bmatrix} \right),$$

where $\lambda_Q$ represents the query vector scalar, $\lambda_K$ represents the key vector scalar, $\sigma(\square)$ represents a sigmoid non-linear change, C represents the context vector, $U_Q$ represents a fourth parameter matrix, $U_K$ represents a fifth parameter matrix, the fourth parameter matrix and the fifth parameter matrix are pre-trained parameter matrices, $V_Q^H$ represents a first linear transformation factor, $V_K^H$ represents a second linear transformation factor, $V_Q^C$ represents a third linear transformation factor, and $V_K^C$ represents a fourth linear transformation factor; and the determination module 1820 is configured to:
calculate the target query vector and the target key vector in the following manner:

$$\begin{bmatrix} \hat{Q} \\ \hat{K} \end{bmatrix} = \left(1 - \begin{bmatrix} \lambda_Q \\ \lambda_K \end{bmatrix}\right) \begin{bmatrix} Q \\ K \end{bmatrix} + \begin{bmatrix} \lambda_Q \\ \lambda_K \end{bmatrix} \left(C \begin{bmatrix} U_Q \\ U_K \end{bmatrix}\right),$$

where $\hat{Q}$ represents the target query vector, and K represents the target key vector.

In an exemplary embodiment, the determination module is configured to:
calculate the logical similarity in the following manner:

$$e = \frac{\hat{Q} \cdot \hat{K}^T}{\sqrt{d}},$$

where e represents the logical similarity, $\hat{Q}$ represents the target query vector, $\hat{K}$ represents the target key vector, $\hat{K}^T$ represents the transpose of the target key vector, and d represents the dimension of the hidden state vector of the model.

In an exemplary embodiment, the decoding module 1830 is configured to:

determine a weight value corresponding to the text encoding result according to the logical similarity, the weight value being used for representing a relationship between elements in the text encoding result;

determine a target output vector according to the weight value corresponding to the text encoding result; and encode the text encoding result by using the target output vector to obtain the text encoding result.

In an exemplary embodiment, the apparatus 1800 further includes:

a division module (not shown in the figure), configured to divide the text encoding result into X text subsequences, X being an integer greater than 1;

the determination module 1820 is configured to:

generate X query vectors and X key vectors according to the context vector and the X text subsequences, each text subsequence corresponding to one query vector and one key vector;

the determining the logical similarity corresponding to the text encoding result according to the target query vector and the target key vector includes:

calculating the each text subsequence and a query vector and a key vector that correspond to the each text subsequence, to obtain X sub-logical similarities;

the decoding module 1830 is configured to:

determine a sub-weight value corresponding to the each text subsequence according to each sub-logical similarity, the sub-weight value being used for representing a relationship between elements in the text subsequence;

determine a sub-output vector according to the sub-weight value corresponding to the each text subsequence;

generate a target output vector according to the sub-output vector corresponding to the each text subsequence; and decode the text encoding result by using the target output vector to obtain the text decoding result.

The term "module" may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module.

Figure 19:
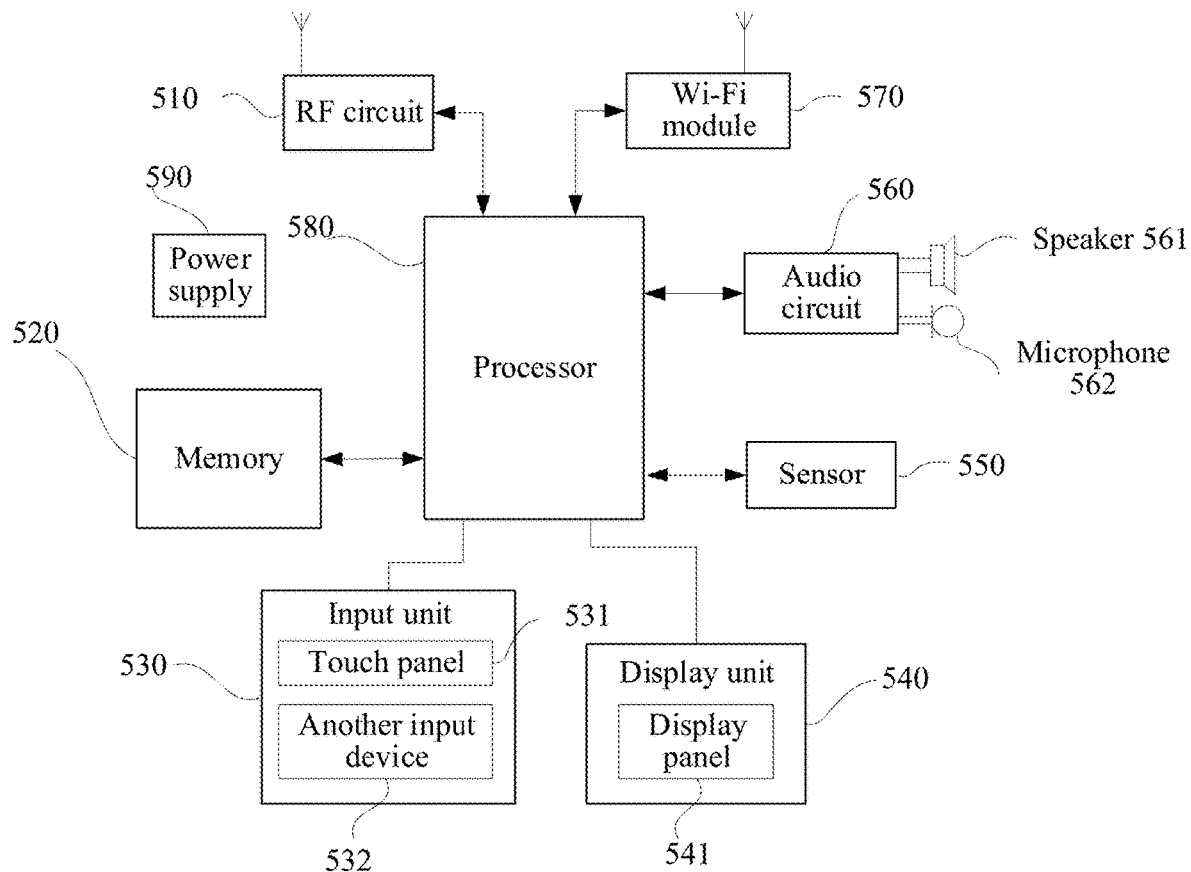
FIG. 19 is a schematic structural diagram of a terminal device according to an embodiment of this disclosure.

An embodiment of the present disclosure further provides another terminal device. As shown in FIG. 19, and for ease of description, only parts related to the embodiment of the present disclosure are shown. For specific technical details that are not disclosed, please refer to the method part of the embodiments of the present disclosure. The terminal device may be any terminal device including a mobile phone, a tablet computer, a personal digital assistant (PDA), a point of sales (POS), and an on-board computer, and the terminal device being a mobile phone is used as an example.

FIG. 19 is a block diagram of the structure of a part of a mobile phone related to a terminal device according to an embodiment of the present disclosure. Referring to FIG. 19, the mobile phone includes components such as a radio frequency (RF) circuit 510, a memory 520, an input unit 530, a display unit 540, a sensor 550, an audio circuit 560, a wireless fidelity (Wi-Fi) module 570, a processor 580, and a power supply 590. A person skilled in the art may understand that the structure of the mobile phone shown in FIG. 19 does not constitute a limitation on the mobile phone, and the mobile phone may include more components or fewer components than those shown in the figure, or some components may be combined, or a different component deployment may be used.

The following makes a specific description of components of the mobile phone with reference to FIG. 19.

The RF circuit 510 may be configured to receive and transmit signals during an information receiving and transmitting process or a call process. Specifically, the RF circuit receives downlink information from a base station, then delivers the downlink information to the processor 580 for processing, and transmits designed uplink data to the base station. Usually, the RF circuit 510 includes, but is not limited to, an antenna, at least one amplifier, a transceiver, a coupler, a low noise amplifier (LNA), and a duplexer. In addition, the RF circuit 510 may also communicate with a network and another device through wireless communication. The wireless communication may use any communication standard or protocol, including but not limited to Global System for Mobile Communication (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 520 may be configured to store a software program and module. The processor 580 runs the software program and module stored in the memory 520, to implement various functional disclosures and data processing of the mobile phone. The memory 520 may mainly include a program storage area and a data storage area. The program storage area may store an operating system, an disclosure program required by at least one function (such as a sound playback function and an image display function), and the like. The data storage area may store data (such as audio data and an address book) created according to the use of the mobile phone, and the like. In addition, the memory 520 may include a high speed random access memory, and may also include a non-volatile memory, such as at least one magnetic disk storage device, a flash memory, or another volatile solid-state storage device.

The input unit 530 may be configured to receive input digit or character information, and generate a keyboard signal input related to the user setting and function control of the mobile phone. Specifically, the input unit 530 may include a touch panel 531 and another input device 532. The touch panel 531, which may also be referred to as a touch screen, may collect a touch operation of a user on or near the touch panel (such as an operation of a user on the touch panel 531 or near the touch panel 531 by using any suitable object or accessory such as a finger or a stylus), and drive a corresponding connection apparatus according to a preset program. In an embodiment, the touch panel 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 580. Moreover, the touch controller can receive and execute a command transmitted from the processor 580. In addition, the touch panel 531 may be implemented by using various types, such as a resistive type, a capacitive type, an infrared type, and a surface acoustic wave type. In addition to the touch panel 531, the input unit 530 may further include the another input device 532. Specifically, the another input device 532 may include, but is not limited to, one or more of a physical keyboard, a functional key (such as a volume control key or a switch key), a track ball, a mouse, and a joystick.

The display unit 540 may be configured to display information inputted by the user or information provided for the user, and various menus of the mobile phone. The display unit 540 may include a display panel 541. In an embodiment, the display panel 541 may be configured by using a liquid crystal display (LCD), an organic light-emitting diode (OLED), or the like. Further, the touch panel 531 may cover the display panel 541. After detecting a touch operation on or near the touch panel 531, the touch panel transfers the touch operation to the processor 580, to determine a type of a touch event. Then, the processor 580 provides a corresponding visual output on the display panel 541 according to the type of the touch event. Although in FIG. 19, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. Specifically, the optical sensor may include an ambient light sensor and a proximity sensor. The ambient light sensor may adjust luminance of the display panel 541 according to brightness of the ambient light. The proximity sensor may switch off the display panel 541 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an disclosure that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 560, a speaker 561, and a microphone 562 may provide audio interfaces between a user and the mobile phone. The audio circuit 560 may convert received audio data into an electrical signal and transmit the electrical signal to the speaker 561. The speaker 561 converts the electrical signal into a sound signal for output. On the other hand, the microphone 562 converts a collected sound signal into an electrical signal. The audio circuit 560 receives the electrical signal, converts the electrical signal into audio data, and outputs the audio data to the processor 580 for processing. Then, the processor transmits the audio data to, for example, another mobile phone by using the RF circuit 510, or outputs the audio data to the memory 520 for further processing.

Wi-Fi is a short distance wireless transmission technology. The mobile phone may help, by using the Wi-Fi module 570, a user receive and transmit an email, browse a web page, access stream media, and the like. This provides wireless broadband Internet access for the user. Although FIG. 19 shows the Wi-Fi module 570, it may be understood that the Wi-Fi module is not a necessary component of the mobile phone, and the Wi-Fi module may be omitted as required provided that the scope of the essence of the present disclosure is not changed.

The processor 580 is a control center of the mobile phone, and is connected to various parts of the entire mobile phone by using various interfaces and lines. By running or executing a software program and/or module stored in the memory 520, and invoking data stored in the memory 520, the processor executes various functions of the mobile phone and performs data processing, thereby monitoring the entire mobile phone. In an embodiment, the processor 580 may include one or more processing units. In an embodiment, the processor 580 may integrate an application processor and a modem. The disclosure processor mainly processes an operating system, a user interface, an disclosure program, and the like. The modem mainly processes wireless communication. It may be understood that the foregoing modem may either not be integrated into the processor 580.

The mobile phone further includes the power supply 590 (such as a battery) for supplying power to the components. In an embodiment, the power supply may be logically connected to the processor 580 by using a power management system, thereby implementing functions such as charging, discharging, and power consumption management by using the power management system.

Although not shown in the figure, the mobile phone may further include a camera, a Bluetooth module, and the like, which are not further described herein.

In this embodiment of the present disclosure, the processor 580 included in the terminal also has the functions of implementing the foregoing method embodiments.

Figure 20:
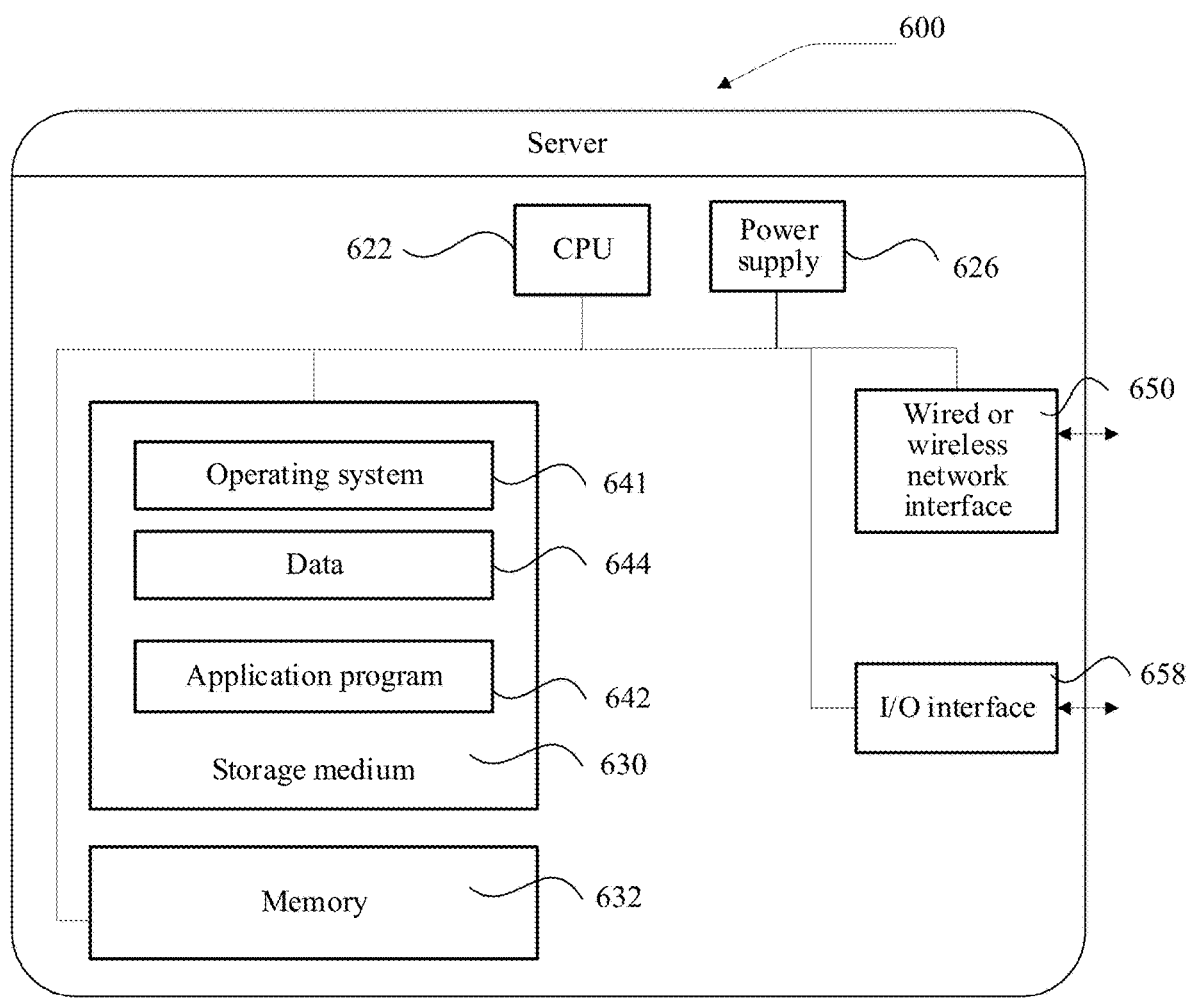
FIG. 20 is a schematic structural diagram of a server according to an embodiment of this disclosure.

FIG. 20 is a schematic structural diagram of a server according to an embodiment of this disclosure. The server 600 may vary greatly due to different configurations or performance, and may include one or more central processing units (CPUs) 622 (for example, one or more processors) and a memory 632, and one or more storage media 630 (for example, one or more mass storage devices) that store disclosure programs 642 or data 644. The memory 632 and the storage medium 630 may be transient or persistent storages. A program stored in the storage medium 630 may include one or more modules (which are not marked in the figure), and each module may include a series of instruction operations on the server. Further, the CPU 622 may be set to communicate with the storage medium 630, and perform, on the server 600, the series of instruction operations in the storage medium 630.

The server 600 may further include one or more power supplies 626, one or more wired or wireless network interfaces 650, one or more input/output (I/O) interfaces 658, and/or one or more operating systems 641 such as Windows Server™, Mac OS X™, Unix™, Linux™, or FreeBSD™.

The steps performed by the server in the foregoing embodiment may be based on the server structure shown in FIG. 20.

In this embodiment of this disclosure, the CPU 622 included in the server has the function of implementing the foregoing method embodiment.

Persons skilled in the art may clearly understand that, for the purpose of convenient and brief description, for a detailed working process of the system, apparatus, and unit described above, refer to a corresponding process in the method embodiments, and details are not described herein again.

In the embodiments provided in this disclosure, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over multiple network units. Some or all of the units may be selected according to actual needs to achieve the objectives of the solutions of the embodiments.

In addition, functional units in the embodiments of this disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The computer software product is stored in a storage medium and includes several instructions for instructing a computer device (which may be a PC, a server, or a network device) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this disclosure, but not for limiting this disclosure. Although this disclosure is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of this disclosure.

What is claimed is:

1. An information processing method, applied to a computer device, comprising:
   obtaining a target text sequence corresponding to to-be-processed text information;
   obtaining a context vector according to the target text sequence;
   determining a logical similarity corresponding to the target text sequence according to the context vector and the target text sequence; and
   encoding the target text sequence by using the logical similarity to obtain a text encoding result.

2. The method according to claim 1, wherein obtaining the context vector according to the target text sequence comprises:
   obtaining a vector of each element in the target text sequence; and
   calculating an average value of the target text sequence according to the vector of the each element in the target text sequence, the average value being used to represent the context vector.

3. The method according to claim 1, wherein obtaining the context vector according to the target text sequence comprises:
   obtaining L layers of text sequences generated before the target text sequence, L being an integer greater than or equal to 1; and
   generating the context vector according to the L layers of text sequences.

4. The method according to claim 1, wherein obtaining the context vector according to the target text sequence comprises:
   obtaining L layers of text sequences corresponding to the target text sequence, the L layers of text sequences being network layers generated before the target text sequence, L being an integer greater than or equal to 1;
   obtaining L layers of first context vectors according to the L layers of text sequences, each layer of first context vector being an average value of elements in the each layer of text sequence;
   obtaining a second context vector according to the target text sequence, the second context vector being an average value of elements in the target text sequence; and
   calculating the context vector according to the L layers of first context vectors and the second context vector.

5. The method according to claim 1, wherein determining the logical similarity corresponding to the target text sequence according to the context vector and the target text sequence comprises:
   determining a target query vector and a target key vector according to the context vector and the target text sequence, the target query vector corresponding to the target text sequence and the target key vector corresponding to the target text sequence; and
   determining the logical similarity according to the target query vector and the target key vector.

6. The method according to claim 5, wherein determining the target query vector and the target key vector according to the context vector and the target text sequence comprises:
   calculating an original query vector, an original key vector and an original value vector according to the target text sequence;
   calculating a query vector scalar and a key vector scalar according to the context vector, the original query vector, and the original key vector; and
   calculating the target query vector and the target key vector according to the context vector, the query vector scalar, and the key vector scalar.

7. The method according to claim 5, wherein determining the logical similarity according to the target query vector and the target key vector comprises:
calculating the logical similarity according to the following manner:

$$e = \frac{\hat{Q} \cdot \hat{K}^T}{\sqrt{d}},$$

wherein e represents the logical similarity, $\hat{Q}$ represents the target query vector, $\hat{K}$ represents the target key vector, $\hat{K}^T$ represents the transpose of the target key vector, and d represents the dimension of the hidden state vector of the model.

8. The method according to claim 5,
wherein the method further comprises:
dividing the target text sequence into X text subsequences, X being an integer greater than 1 after obtaining the target text sequence corresponding to the to-be-processed text information; and
wherein determining the target query vector and the target key vector according to the context vector and the target text sequence comprises:
generating X query vectors and X key vectors according to the context vector and the X text subsequences, each text subsequence corresponding to one query vector and one key vector.

9. The method according to claim 8, wherein:
determining the logical similarity according to the target query vector and the target key vector comprises calculating the each text subsequence and a query vector and a key vector that correspond to the each text subsequence to obtain X sub-logical similarities.

10. The method according to claim 9, wherein:
encoding the target text sequence by using the logical similarity to obtain the text encoding result comprises:
determining a sub-weight value corresponding to the each text subsequence according to the each sub-logical similarity, the sub-weight value representing a relationship between elements in the text subsequence;
determining a sub-output vector according to the sub-weight value corresponding to the each text subsequence;
generating a target output vector according to the sub-output vector corresponding to the each text subsequence; and
encoding the target text sequence by using the target output vector to obtain the text encoding result.

11. The method according to claim 1, wherein encoding the target text sequence by using the logical similarity to obtain the text encoding result comprises:
determining a weight value corresponding to the target text sequence according to the logical similarity, the weight value being used for representing a relationship between elements in the target text sequence;
determining a target output vector according to the weight value corresponding to the target text sequence; and
encoding the target text sequence by using the target output vector to obtain the text encoding result.

12. The method according to claim 1, wherein obtaining the context vector according to the target text sequence comprises:
obtaining vector relationships between elements in the target text sequence; and calculating the context vector according to the vector relationships between the elements in the target text sequence.

13. The method according to claim 1, further comprising:
obtaining a target context vector according to the text encoding result;
determining a logical similarity corresponding to the text encoding result according to the target context vector and the text encoding result; and
decoding the text encoding result by using the logical similarity corresponding to the text encoding result to obtain a text decoding result.

14. An information processing apparatus, comprising:
a memory, configured to store a program;
a processor; and
a bus system, being configured to electrically couple the memory and the processor and to enable the memory and the processor to communicate with each other, wherein the processor is configured to execute the program in the memory to perform a plurality of steps comprising:
obtaining a target text sequence corresponding to to-be-processed text information;
obtaining a context vector according to the target text sequence;
determining a logical similarity corresponding to the target text sequence according to the context vector and the target text sequence; and
encoding the target text sequence by using the logical similarity to obtain a text encoding result.

15. The information processing apparatus according to claim 14, wherein the processor is further configured to execute the program in the memory to perform steps, comprising:
obtaining a target context vector according to the text encoding result;
determining a logical similarity corresponding to the text encoding result according to the target context vector and the text encoding result; and
decoding the text encoding result by using the logical similarity corresponding to the text encoding result to obtain a text decoding result.

16. The information processing apparatus according to claim 14, wherein the step of obtaining the context vector according to the target text sequence comprises:
obtaining a vector of each element in the target text sequence; and
calculating an average value of the target text sequence according to the vector of the each element in the target text sequence, the average value being used for representing the context vector.

17. The information processing apparatus according to claim 14, wherein the step of determining the logical similarity corresponding to the target text sequence according to the context vector and the target text sequence comprises:
determining a target query vector and a target key vector according to the context vector and the target text sequence, the target query vector corresponding to the target text sequence and the target key vector corresponding to the target text sequence; and
determining the logical similarity according to the target query vector and the target key vector.

18. The information processing apparatus according to claim 17, wherein:
the processor is further configured to execute the program in the memory to perform the step of dividing the target text sequence into X text subsequences, X being an integer greater than 1 after obtaining the target text sequence corresponding to the to-be-processed text information; and determining the target query vector and the target key vector according to the context vector and the target text sequence comprises:

generating X query vectors and X key vectors according to the context vector and the X text subsequences, each text subsequence corresponding to one query vector and one key vector.

19. The information processing apparatus according to claim 18, wherein:

determining the logical similarity according to the target query vector and the target key vector comprises calculating the each text subsequence and a query vector and a key vector that correspond to the each text subsequence to obtain X sub-logical similarities; and encoding the target text sequence by using the logical similarity to obtain the text encoding result comprises:

determining a sub-weight value corresponding to the each text subsequence according to the each sub-logical similarity, the sub-weight value representing a relationship between elements in the text subsequence;

determining a sub-output vector according to the sub-weight value corresponding to the each text subsequence;

generating a target output vector according to the sub-output vector corresponding to the each text subsequence; and encoding the target text sequence by using the target output vector to obtain the text encoding result.

20. A non-transitory computer readable medium storing a computer-readable program, when executed, causing a computer device to perform a plurality of steps, comprising:

obtaining a target text sequence corresponding to to-be-processed text information;

obtaining a context vector according to the target text sequence;

determining a logical similarity corresponding to the target text sequence according to the context vector and the target text sequence; and encoding the target text sequence by using the logical similarity to obtain a text encoding result.

* * * * *